US010958564B1

(12) United States Patent
Asthana et al.

(10) Patent No.: US 10,958,564 B1
(45) Date of Patent: Mar. 23, 2021

(54) RENDEZVOUS POINT (RP) ROUTER WITH IMPROVED PROCESSING OF FIRST HOP ROUTER (FHR) INFORMATION IN A PROTOCOL INDEPENDENT MULTICAST (PIM) NETWORK DOMAIN

(71) Applicant: Juniper Networks, Inc., Sunnyvale, CA (US)

(72) Inventors: Abhishek Asthana, Bangalore (IN); Abhishek Chakraborty, Bangalore (IN); Rajesh Shetty Manur, Bangalore (IN); Joya Neema, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 6 days.

(21) Appl. No.: 16/216,974

(22) Filed: Dec. 11, 2018

(51) Int. Cl.
*H04L 12/761* (2013.01)
*H04L 12/753* (2013.01)
*H04L 12/715* (2013.01)
*H04L 12/707* (2013.01)
*H04L 12/733* (2013.01)
*H04L 12/703* (2013.01)
*H04L 12/18* (2006.01)

(52) U.S. Cl.
CPC .............. *H04L 45/16* (2013.01); *H04L 45/04* (2013.01); *H04L 45/20* (2013.01); *H04L 45/22* (2013.01); *H04L 45/28* (2013.01); *H04L 45/48* (2013.01); *H04L 12/185* (2013.01)

(58) Field of Classification Search
CPC ......... H04L 45/16; H04L 45/04; H04L 45/20; H04L 45/22; H04L 45/28; H04L 45/48; H04L 12/185; H04L 12/18; H04L 65/4076
See application file for complete search history.

(56) References Cited

U.S. PATENT DOCUMENTS

2017/0093689 A1* 3/2017 Manur ................ H04L 65/4076

OTHER PUBLICATIONS

Fenner et al., Protocol Independent Multicast—Sparse Mode (PIM-SM): Protocol Specification (Revised), Aug. 2006, IETF, RFC 4601, pp. 1-112. (Year: 2006).*
"Protocol Independent Multicast—Sparse-mode (PIM-SM): Protocol Specification (Revised)," *Request for Comments 4601* (Internet Engineering Task Force, Aug. 2006).
"Multicast Source Discovery Protocol (MSDP)," *Request for Comments 3618* (Network Working Group, Oct. 2003).

* cited by examiner

*Primary Examiner* — Muhammad Raza
(74) *Attorney, Agent, or Firm* — John C. Pokotylo; Pokotylo Patent Services

(57) ABSTRACT

Multiple Register State Machines on a rendezvous point router ("RP") in a Protocol Independent Multicast-Sparse Mode ("PIM-SM") domain per (S,G) is supported, thereby increasing the Register state consistency and faster convergence in case of a first hop router ("FHR") failure. Such example embodiments may advantageously eliminate the limitation of a single Register State Machine on RP for a given (S,G), in the presence of multiple FHRs connected to the same source. At least some such example embodiments provide the capability of maintaining multiple Register State Machines on RP for a given (S,G), in a way, that maps one Register State Machine to each FHR. In this way, the RP can avoid the inconsistent FHR states and traffic losses caused due to FHR failures.

20 Claims, 23 Drawing Sheets

DISTRIBUTION TREE(S) TO
MULTICAST RECEIVERS

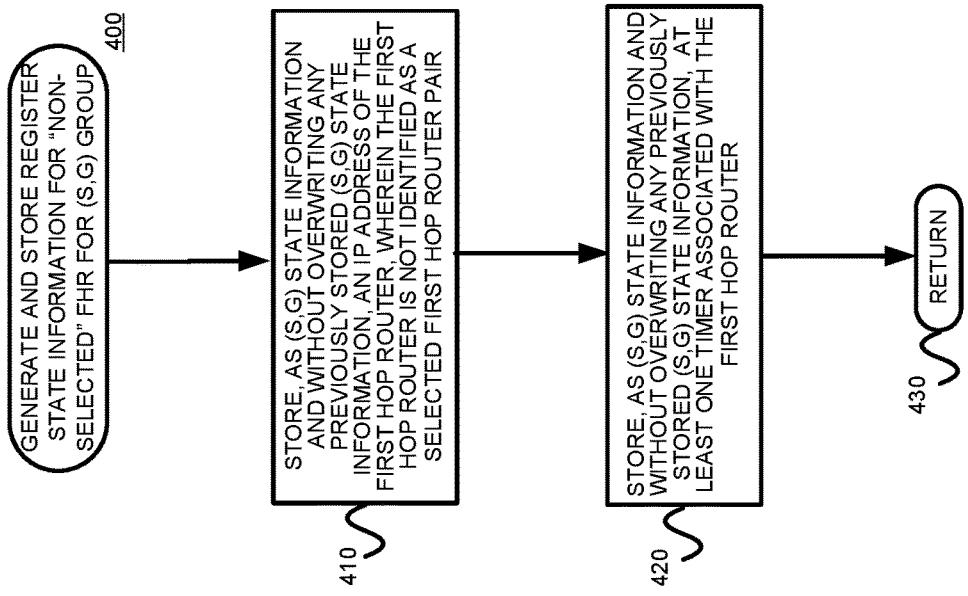
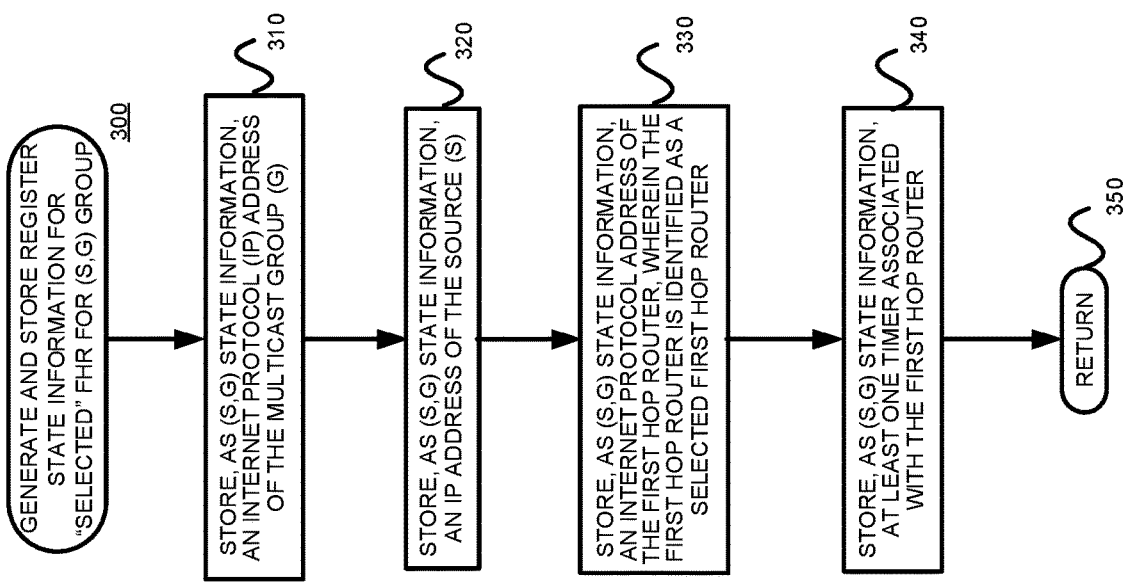

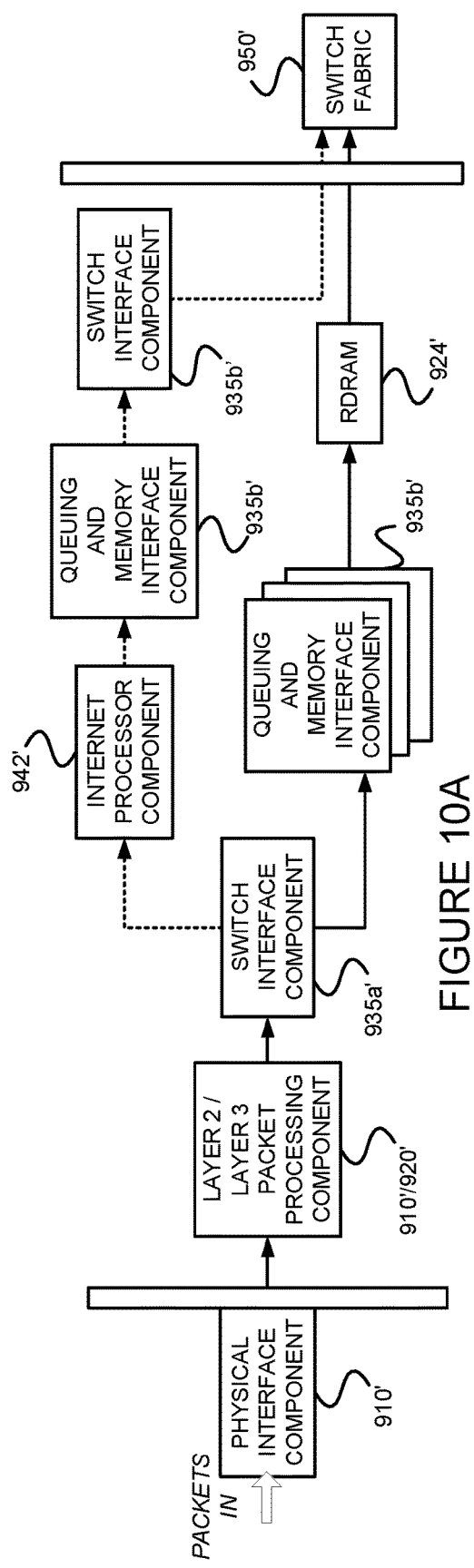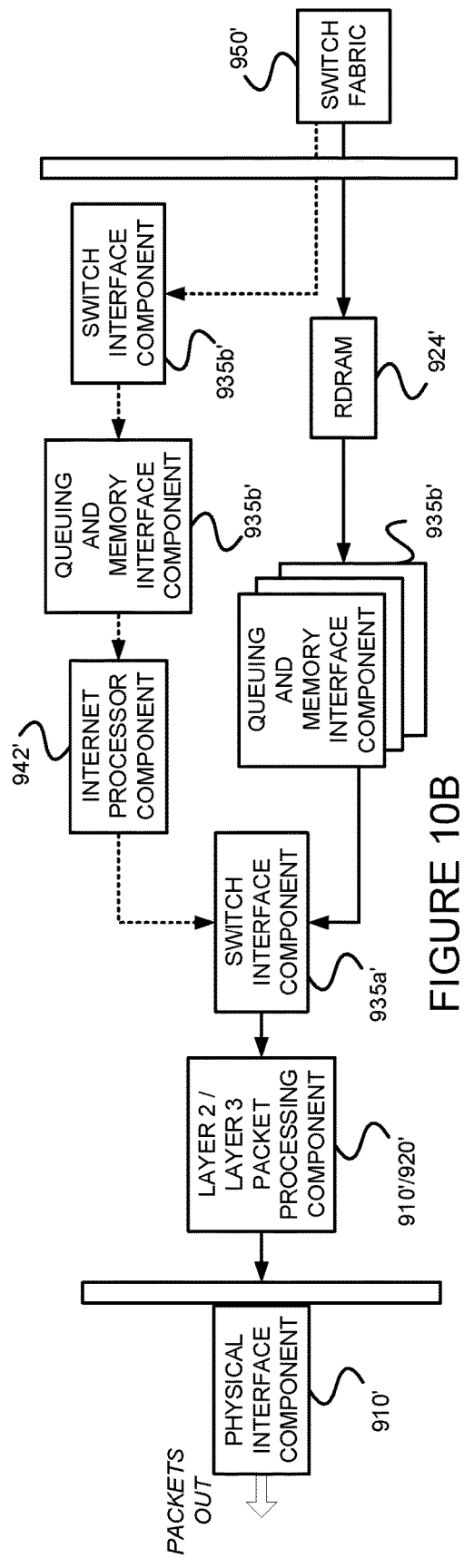
FIGURE 10A
FIGURE 10B

RENDEZVOUS POINT (RP) ROUTER WITH IMPROVED PROCESSING OF FIRST HOP ROUTER (FHR) INFORMATION IN A PROTOCOL INDEPENDENT MULTICAST (PIM) NETWORK DOMAIN

§ 1. BACKGROUND OF THE INVENTION

§ 1.1 Field of the Invention

The present description concerns communications networks. In particular, the present description concerns improving a rendezvous point router ("RP router," or simply "RP") used in a protocol independent multicast ("PIM") network domain.

§ 1.2 Background Information

"Multicast" communications concern sending data from a source to a group of receivers (unlike "broadcast" communications from a source to all receivers, or point-to-point communications from a single source to a single receiver). To enable multicast communications, the network must determine (1) the source and (2) the receivers. These determinations may be made using (A) a dense-mode (push) technique, in which data is flooded to many hosts, and then pruned, or (B) a sparse-mode (pull) technique, in which receivers find the source and then join a multicast group. Sparse-mode multicast is more commonly used because it uses network resources more efficiently.

The document "Protocol Independent Multicast—Sparse-mode ("PIM-SM"): Protocol Specification (Revised)," Request for Comments 4601 (Internet Engineering Task Force, August 2006) (referred to as "RFC 4601" and incorporated herein by reference) and "Protocol Independent Multicast—Sparse-mode ("PIM-SM"): Protocol Specification (Revised)," Request for Comments 7761 (Internet Engineering Task Force, March 2016) (referred to as "RFC 7761" and incorporated herein by reference) specify a multicast routing protocol that can use the underlying unicast routing information base or a separate multicast-capable routing information base to perform multicast. RFC 4601 specifies building unidirectional shared trees from multicast receivers, rooted at an RP, per multicast group ("G"). It optionally creates shortest path trees ("SPTs") per multicast source ("S"). That is, an RP is used as a point to match receivers subscribing to a multicast group, with a source of the multicast group. Although multicast communications may initially pass through the RP (sometimes referred to as a "core-based" tree), alternative paths (such as SPT(s)) from the source to the receiver(s) subscribing to the multicast group may be established.

Although section 3 of RFC 4601 describes an overview of the PIM-SM protocol, it is summarized in § 1.2.1 for the reader's convenience.

§ 1.2.1 PIM-SM Overview

A PIM-SM domain uses reverse-path forwarding ("RPF") to create a path from a data source to the receiver requesting the data. When a receiver issues an explicit join request, an RPF check is triggered. A (*,G) PIM join message (which may be a single packet) is sent toward the RP from the receiver's designated router ("DR"). A DR may also be referred to as a last hop router ("LHR"). The PIM join message is multicast, hop-by-hop, upstream to the ALL-PIM-ROUTERS group (224.0.0.13) by means of each router's RPF interface until it reaches the RP. The RP receives the (*,G) PIM join message and adds the interface on which it was received to the outgoing interface list ("OIL") of the rendezvous-point tree ("RPT") forwarding state entry. This builds the RPT connecting the receiver with the RP. The RPT remains in effect, even if no active sources generate traffic.

The (*,G) or (S,G) entries are the information used for forwarding unicast or multicast packets. S is the source IP address, G is the multicast group address, and * represents any source sending to group G. Routers keep track of the multicast forwarding state (also referred to as the "state machine") for the incoming and outgoing interfaces for each group.

When a source becomes active, the source DR (also referred to as a first hop router ("FHR")) encapsulates multicast data packets into a PIM register message (referred to as a "non-NULL" PIM register message) and sends them by means of unicast to the RP router. Up until this point, the RP might not have known the IP address of the source.

If the RP router has interested receivers (that is, receivers that have previously sent a (*,G) PIM join to the RP) in the PIM sparse-mode domain, it sends a PIM join message toward the source to build a SPT back to the source. The source sends multicast packets out on the LAN, and the source DR (or FHR) encapsulates the packets in a PIM register message and forwards the message toward the RP router by means of unicast. The RP router receives PIM register messages back from the source, and thus adds a new source to the distribution tree, keeping track of sources in a PIM table. Once an RP router receives packets natively (with (S,G)), it sends a (S,G) PIM register stop message to stop receiving the register messages by means of unicast. This is done to avoid encapsulation and decapsulation since it is no longer necessary.

In actual application, many receivers with multiple SPTs are involved in a multicast traffic flow. To illustrate the process, the following example tracks the multicast traffic from the RP to one receiver. In such a case, the RP begins sending multicast packets down the RPT toward the receiver's DR for delivery to the interested receivers. When the receiver's DR receives the first packet from the RPT, the DR sends a (S,G) PIM join message toward the source DR to start building an SPT back to the source. When the source DR receives the (S,G) PIM join message from the receiver's DR, it starts sending traffic down all SPTs.

When the first multicast packet is received by the receiver's DR, the receiver's DR sends a (S,G) PIM prune message to the RP to stop duplicate packets from being sent through the RPT. In turn, the RP stops sending multicast packets to the receiver's DR, and sends an (S,G) PIM prune message for this source over the RPT toward the source DR to halt multicast packet delivery to the RP from that particular source.

If the RP receives a (S,G) PIM register message from an active source but has no interested receivers in the PIM sparse-mode domain, it still adds the active source into the PIM table. However, after adding the active source into the PIM table, the RP sends an (S,G) PIM register stop message. In this way, if a receiver later sends a (*,G) PIM join message to the RP, the RP will know the source for the multicast group. Thus, the RP discovers the active source's existence and no longer needs to receive advertisement of the source (which utilizes resources).

Some important characteristics of PIM-SM are as follows. First, routers with downstream receivers join a PIM-SM tree through an explicit join message. Second, PIM-SM RPs are where receivers meet sources. Third, senders announce their existence to one or more RPs, and receivers query RPs to find multicast sessions. Fourth, once receivers get content from sources through the RP, the LHR (i.e., the router closest to the receiver) can optionally remove the RP from the shared distribution tree (*,G) (recall the "core-based" tree through the RP) if the new source-based tree (S,G) is shorter. In this way, receivers can then get content directly (i.e., without needing to pass through the RP) from the source. The transitional aspect of PIM-SM from shared ("core-based) tree to source-based tree is one of the major features of PIM, because it prevents overloading the RP or its surrounding core links.

There are related issues regarding source, RPs, and receivers when sparse-mode multicast is used. First, sources must be able to send to all RPs. Second, receivers must send explicit join messages to a known RP. Receivers initially need to know only one RP (they can learn about others later). Receivers can explicitly prune themselves from a tree. Receivers that never transition to a source-based tree are effectively running core-based trees ("CBTs").

PIM-SM has standard features for all of these issues. The RP router serves as the information exchange point for the other routers. All routers in a PIM domain provide mapping to an RP. The RP is the only router that needs to know the active sources for a domain; the other routers just need to know how to reach the RP. In this way, the RP matches receivers with sources. The RP router is downstream from the source and forms one end of the SPT. The RP router is upstream from the receiver and thus forms one end of the rendezvous-point tree. The benefit of using the RP as the information exchange point is that it reduces the amount of state in non-RP routers. No network flooding is required to provide non-RP routers information about active sources.

RPs can be learned in various ways, but is often configured in routers in the PIM domain statically.

PIM relies on an underlying topology-gathering protocol to populate a routing table with routes. This routing table is called the Multicast Routing Information Base ("MRIB"). The routes in this table may be taken directly from the unicast routing table, or they may be different and provided by a separate routing protocol. Regardless of how it is created, the primary role of the MRIB in the PIM protocol is to provide the nexthop router along a multicast-capable path to each destination subnet. The MRIB is used to determine the next-hop neighbor to which any PIM join/prune message is sent. Data flows along the reverse path of the PIM join messages. Thus, in contrast to the unicast RIB, which specifies the next hop that a data packet would take to get to some subnet, the MRIB gives reverse-path information and indicates the path that a multicast data packet would take from its origin subnet to the router that has the MRIB. As noted above, the RP permits PIM-SM to route data packets from sources to receivers without either the sources or receivers knowing, a priori, of the existence of the others.

As summarized above, this is essentially done in three phases (though all three phases may occur simultaneously since senders and receivers may come and go at any time).

In the first phase, a multicast receiver expresses its interest in receiving traffic destined for a multicast group (typically using the Internet Group Management Protocol ("IGMP") or Multicast Listener Discover ("MLD") defined, for example, in RFC 4604, which is incorporated herein by reference. One of the receiver's local routers is elected as the DR (also referred to as "last hop router" or "LHR") for that subnet. On receiving the receiver's expression of interest, the DR then sends a (*,G) PIM join message towards the RP for that multicast group. The (*,G) PIM join travels, hop-by-hop, towards the RP for the group, and in each router it passes through, multicast tree state for group G is instantiated. Eventually, the (*,G) PIM join either reaches the RP or reaches a router that already has (*,G) join state for that group. When many receivers join the group, their PIM join messages converge on the RP and form a distribution tree for group G that is rooted at the RP. This is known as the RP Tree ("RPT"), and is also known as the shared tree because it is shared by all sources sending to that group. PIM join messages are resent periodically so long as the receiver remains in the group.

When all receivers on a leaf-network leave the group, the DR will send a (*,G) PIM prune message towards the RP for that multicast group. However, if the PIM prune message is not sent for any reason, the state will eventually time out.

A multicast data sender just starts sending data destined for a multicast group. The sender's local router (DR, also referred to as FHR) takes those data packets, unicast-encapsulates them, and sends them directly to the RP. The RP receives these encapsulated data packets, decapsulates them, and forwards them onto the shared tree. The packets then follow the (*,G) multicast tree state in the routers on the RPT, being replicated wherever the RPT branches, and eventually reaching all the receivers for that multicast group. The process of encapsulating data packets to the RP is called "registering," and the encapsulation packets are known as "PIM register packets." Since such PIM register packets include data, they are considered to be "non-null" PIM register packets.

At the end of phase one, multicast traffic is flowing encapsulated to the RP, and then natively over the RP tree to the multicast receivers.

The second phase uses a PIM stop message to stop the encapsulated multicast data. Although Register-encapsulation may continue indefinitely, the RP will normally choose to switch to native forwarding because register-encapsulation of the multicast data packets is inefficient for at least two reasons. First, encapsulation and decapsulation may be relatively expensive operations for a router to perform, depending on whether or not the router has appropriate hardware for these tasks. Second, traveling all the way to the RP, and then back down the shared tree may result in the packets traveling a relatively long distance to reach receivers when a shorter path may be available.

To switch over the native forwarding, when the RP receives a register encapsulated data packet from source S on group G, it will normally initiate an (S,G) PIM join message towards S. As noted above, this (S,G) PIM join message travels hop-by-hop towards S, instantiating (S,G) multicast tree state in the routers along the path. The (S,G) multicast tree state is used only to forward packets for group G if those packets come from source S. Eventually the (S,G) join message reaches S's subnet or a router that already has (S,G) multicast tree state, and then packets from S start to flow following the (S,G) tree state towards the RP. These data packets may also reach routers with (*,G) state along the path towards the RP; if they do, they can shortcut onto the RP tree at this point.

While the RP is in the process of joining the source-specific tree for S, the data packets will continue being encapsulated to the RP. When packets from S also start to arrive natively at the RP, the RP will be receiving two copies of each of these packets. At this point, the RP starts to discard the encapsulated copy of these packets, and it sends an (S,G) PIM stop message back to S's DR ("FHR") to prevent the DR from unnecessarily encapsulating the packets.

Thus, at the end of the second phase, traffic will be flowing natively from S along a source-specific tree to the RP, and from there along the shared tree to the receivers. Where the two trees intersect, traffic may transfer from the source-specific tree to the RP tree and thus avoid taking a long detour via the RP.

Note that a sender may start sending before or after a receiver joins the multicast group. Consequently, the second phase may happen before the shared tree to the receiver is built.

In the third phase, a router on the receiver's LAN, typically the DR ("LHR"), may optionally initiate a transfer from the shared-core tree to a source-specific SPT. More specifically, although having the RP join back towards the source in the second phase removes the encapsulation overhead, it does not completely optimize the forwarding paths. For many receivers, the route via the RP may involve a significant detour when compared with the shortest path from the source to the receiver.

To initiate a transfer from the shared (or "core-based") tree to a source-specific SPT, the router on the receiver's LAN (e.g., the LHR) issues an (S,G) PIM join message towards S. This instantiates state in the routers along the path to S. Eventually, this (S,G) PIM join message either reaches S's subnet or reaches a router that already has (S,G) state. When this happens, data packets from S start to flow following the (S,G) state until they reach the receiver.

At this point, the receiver (or a router upstream of the receiver) will be receiving two copies of the data: one from the SPT and one from the RPT (or shared tree, or core-based tree). When the first traffic starts to arrive from the SPT, the DR (e.g., LHR) or upstream router starts to drop the packets for G from S that arrive via the RPT. In addition, it sends an (S,G) PIM prune message towards the RP. This is known as an (S,G,rpt) Prune. The prune message travels hop-by-hop, instantiating state along the path towards the RP, indicating that traffic from S for G should not be forwarded in this direction. The prune is propagated until it reaches the RP or a router that still needs the traffic from S for other receivers.

By now, the receiver will be receiving traffic from S along the SPT between the receiver and S. In addition, the RP is receiving the traffic from S, but this traffic is no longer reaching the receiver along the RP tree. As far as the receiver is concerned, this is the final distribution tree.

§ 1.2.2 PIM-SM State

As should be appreciated from the foregoing, each step of the PIM-SM protocol may involve one or both of (1) creating "state" in the router's multicast routing table, and (2) sending PIM register messages (e.g., join, prune, stop, etc.).

State of the PIM protocol is referred to as "tree information base" ("TIB"), as it holds the state of all the multicast distribution trees at a particular router. Most implementations of PIM-SM use the TIB to build a multicast forwarding table, which would then be updated when the relevant state in the TIB changes.

Although RFC 4601 specifies the state to be kept, it does so in the form of an abstract state definition, which is needed in order to specify the router's behavior. A PIM-SM implementation compliant with RFC 4601 is free to hold whatever internal state it requires, provided it results in the same externally visible protocol behavior as an abstract router that holds the following state.

The TIB state may include (1) (*,*,RP) state, (2) (*,G) state, (3) (S,G) state and (4) (S,G,rpt) state. The (*,*,RP) state maintains per-RP trees, for all groups served by a given RP. The (*,G) state maintains the RP tree for G. The (S,G) state maintains a source-specific tree for source S and group G. Finally, the (S,G,rpt) state maintains source-specific information about source S on the RP tree for G.

For every group G, a router keeps the following state (*,G) state:
  For each interface:
    Local Membership:
      State: One of {"NoInfo", "Include"}
    PIM (*,G) Join/Prune State:
      State: One of {"NoInfo" (NI), "Join" (J), "Prune-Pending" (PP)}
      Prune-Pending Timer (PPT)
      Join/Prune Expiry Timer (ET)
    (*,G) Assert Winner State
      State: One of {"NoInfo" (NI), "I lost Assert" (L), "I won Assert" (W)}
      Assert Timer (AT)
      Assert winner's IP Address (AssertWinner)
      Assert winner's Assert Metric (AssertWinnerMetric)
  Not interface specific:
    Upstream (*,G) Join/Prune State:
      State: One of {"NotJoined(*,G)", "Joined(*,G)"}
    Upstream Join/Prune Timer (JT)
    Last RP Used
    Last RPF Neighbor towards RP that was used Local membership is the result of the local membership mechanism (such as IGMP or MLD) running on that interface. It need not be kept if this router is not the DR on that interface unless this router won a (*,G) assert on this interface for this group, although implementations may optionally keep this state in case they become the DR or assert winner. This information should be stored if possible, as it reduces latency converging to stable operating conditions after a failure causing a change of DR.

PIM (*,G) Join/Prune state is the result of receiving (*,G) PIM join/prune messages on this interface. The state is used by the macros that calculate the outgoing interface list and to decide whether a (*,G) join message should be sent upstream.

(*,G) Assert Winner state is the result of sending or receiving (*,G) Assert messages on this interface.

The upstream (*,G) Join/Prune State reflects the state of the upstream (*,G) state machine.

The upstream (*,G) Join/Prune Timer is used to send out periodic (*,G) join messages, and to override (*,G) prune messages from peers on an upstream LAN interface.

The last RP used must be stored because if the RP-Set changes, then state must be torn down and rebuilt for groups whose RP changes.

The last RPF neighbor towards the RP is stored because if the MRIB changes, then the RPF neighbor towards the RP may change. If it does so, a new (*,G) join message to the new upstream neighbor and a (*,G) prune message to the old upstream neighbor are triggered. Similarly, if a router detects through a changed GenID in a Hello message that the upstream neighbor towards the RP has rebooted, then it should re-instantiate state by sending a (*,G) join message.

For every source/group pair (S,G), a router keeps the following state:
  (S,G) state:
    For each interface:
      Local Membership:
        State: One of {"NoInfo", "Include"}
      PIM (S,G) Join/Prune State:
        State: One of {"NoInfo" (NI), "Join" (J), "Prune-Pending" (PP)}

Prune-Pending Timer (PPT)
Join/Prune Expiry Timer (ET)
(S,G) Assert Winner State
State: One of {"NoInfo" (NI), "I lost Assert" (L), "I won Assert" (W)}
Assert Timer (AT)
Assert winner's IP Address (AssertWinner)
Assert winner's Assert Metric (AssertWinnerMetric)
Not interface specific:
Upstream (S,G) Join/Prune State:
State: One of {"NotJoined(S,G)", "Joined(S,G)"}
Upstream (S,G) Join/Prune Timer (JT)
Last RPF Neighbor towards S that was used
SPTbit (indicates (S,G) state is active)
(S,G) Keepalive Timer (KAT)
Additional (S,G) state at the DR:
Register state: One of {"Join" (J), "Prune" (P), "Join-Pending" (JP), "NoInfo" (NI)}
Register-Stop timer
Additional (S,G) state at the RP:
PMBR: the first PMBR to send a Register for this source with the Border bit set.

Local membership is the result of the local source-specific membership mechanism (such as IGMP version 3) running on that interface and specifying that this particular source should be included. As stored here, this state is the resulting state after any IGMPv3 inconsistencies have been resolved. It need not be kept if the router is not the DR on that interface unless this router won a (S,G) assert on this interface for this group. However, this information should be stored if possible, as it reduces latency converging to stable operating conditions after a failure causing a change of DR.

PIM (S,G) Join/Prune state is the result of receiving (S,G) PIM join/prune messages on this interface. The state is used by the macros that calculate the outgoing interface list, and to decide whether a (S,G) join message should be sent upstream.

(S,G) Assert Winner state is the result of sending or receiving (S,G) Assert messages on this interface.

The upstream (S,G) Join/Prune State reflects the state of the upstream (S,G) state machine.

The upstream (S,G) Join/Prune Timer is used to send out periodic (S,G) join messages, and to override (S,G) prune messages from peers on an upstream LAN interface.

The last RPF neighbor towards S is stored because if the MRIB changes, then the RPF neighbor towards S may change. If it does so, then a new (S,G) join message to the new upstream neighbor and an (S,G) prune message to the old upstream neighbor should be triggered. Similarly, if the router detects through a changed GenID in a Hello message that the upstream neighbor towards S has rebooted, then it should re-instantiate state by sending an (S,G) join message.

The SPTbit is used to indicate whether forwarding is taking place on the (S,G) SPT or on the (*,G) tree. A router can have (S,G) state and still be forwarding on (*,G) state during the interval when the source-specific tree is being constructed. When SPTbit is FALSE, only (*,G) forwarding state is used to forward packets from S to G. When SPTbit is TRUE, both (*,G) and (S,G) forwarding state are used.

The (S,G) Keepalive Timer is updated by data being forwarded using this (S,G) forwarding state. It is used to keep (S,G) state alive in the absence of explicit (S,G) Joins. Amongst other things, this is necessary for the so-called "turnaround rules"—when the RP uses (S,G) join messages to stop encapsulation, and then (S,G) prune messages to prevent traffic from unnecessarily reaching the RP.

On a DR, the (S,G) Register State is used to keep track of whether to encapsulate data to the RP on the Register Tunnel; the (S,G) Register-Stop timer tracks how long before encapsulation begins again for a given (S,G). On an RP, the PMBR value must be cleared when the Keepalive Timer expires.

§ 1.2.3 PIM-SM State Problems Caused when a Source(s) has More than One First Hop Router (FHR)

As noted above, RFC-4601 describes a method in which a centralized router (i.e., the RP) is used to let receiver(s) know about the source(s). PIM register messages used for this purpose are channeled via the FHR(s) for the source(s) and the LHR(s) for the receiver(s). Recall that a major part of the communication between the FHR and the RP happens through PIM register messages (e.g., packets). Recall further that RP and FHR maintain one register state (also referred to as a "register state machine") for each of the active multicast source and group to decide on further communication.

To summarize, with PIM-Any Source Mode ("PIM-ASM"), the sender just starts sending the multicast traffic to the destined address. The sender's DR (FHR), upon receiving the multicast traffic, adds a multicast route with OIF as the encapsulation interface for the (S,G). This encapsulated message is conveyed to RP as a data PIM register packet (that is, a "non-NULL" PIM register packet). Subsequently, on receiving an (S,G) PIM stop message from RP, Periodic Empty Registers are sent by the FHR to keep RP informed about the active source with which it is associated. The RP learns about active multicast sources on receiving the data register packets (non-Null PIM register packets) from the FHR. If RP has interest for this multicast group, it would send an (S,G) PIM join message towards the source to pull native multicast traffic. Upon receiving traffic on native PIM interface, the RP will send an (S,G) PIM stop message towards the FHR to stop the encapsulation. Thereafter, the RP sends an (S,G) PIM stop message in response to every periodic NULL (S,G) PIM register packet received from the FHR in order to maintain the register states.

As the number of FHRs for a single source increases, an increased amount of inconsistency occurs when trying to maintain the register states on the RP. This is because the RP keeps overwriting its register state machine in order to maintain only one register state per (S, G). This churn on the RP will be observed for every NULL or Non-NULL PIM register packet received from different FHRs. These continuous changes in the register state machine on RP results in an inconsistent behavior and a negative impact on the performance of RP and FHR, which are integral parts of the PIM-ASM. This may become a problem in network topologies in which the traffic enters via a WAN and gets distributed to multiple FHRs in the network. In such a network topology, frequent bursts of source-active messages are exchanged between Multicast Source Discovery Protocol ("MSDP") peers.

Note also that in case of an FHR failure, the RP cleans up the current register state machine and waits to form a fresh register state towards the new FHR. This wait results in traffic loss.

Referring to FIGS. 1A-1G, consider a PIM topology in which both FHR1 130a (IP Address: 50.1.1.1) and FHR2 130b (IP Address: 60.1.1.1) receive traffic from the same source 110 (IP Address 100.1.1.1) and form Register State Machine with a common RP 140 (e.g., as per § 4.4.1 of RFC 4601). The distribution tree(s) from the RP 140 to any receiver(s) are not shown. The stepwise interactions between FHR1 130*a*, FHR2 130*b* and RP 140, leading to the issue of overwriting register states, are now described with reference to FIGS. 1A-1G.

FHR 1 130*a* receives multicast data (FIG. 1A), encapsulates it and sends it as non-null PIM register packets encapsulating the multicast data. The RP 140 receives a data register packet(s) from FHR1 130*a* (FIG. 1B). Referring to FIG. 1C, upon receiving data register packet(s), RP 140 creates a register state machine 145 with FHR1 130*a*. As shown, the register state machine 145 includes the IP address of FHR1, the (S,G) address and one or more register timer(s). The RP 140 also installs a multicast route with RPF as a PIM-decapsulation interface. Still referring to FIG. 1C, the RP 140 then sends an (S,G) PIM join packet towards FHR1 130*a* and waits for traffic to arrive on native PIM interface. Until then, the RP 140 continues to accept traffic on the PIM-decapsulation interface encapsulated within data register packets.

Referring now to FIG. 1D, once the multicast traffic arrives on the native PIM interface, the RP 140 updates the (S,G) multicast route with RPF as native PIM interface. Then, as shown in FIG. 1E, the RP 140 sends an (S,G) stop PIM register packet towards FHR1 130*a*. As shown in FIG. 1F, the FHR1 130*a* can now send multicast data in its native (that is, unencapsulated) form.

Thereafter, the RP 140 keeps responding to the periodic (S,G) NULL PIM register packets received from FHR1 130*a* by sending an (S,G) PIM stop register packet, to maintain the (S,G) register states between RP 140 and FHR1 130*a*.

Finally, referring to FIG. 1G, after the RP 140 has already formed (S,G) register state machine with FHR1 130*a*, first hop router 2 (FHR2) 130*b* receives multicast data, encapsulates it, and sends a data register packet(s) to the RP 140. On receiving data register packet(s) from FHR2 130*b*, the RP 140 now thinks that the sender's 110 designated router (DR, or FHR) has changed from FHR1 to FHR2. In response, the RP 140 performs a cleanup of existing the (S,G) Register State Machine with FHR1 130*a* (indicated with strike-through in 145') and creates a new (S,G) Register State Machine with FHR2 130*b*.

Still referring to FIG. 1G, the RP 140 sends an (S,G) PIM stop register packet towards FHR2 130*b* immediately, since the RP 140 has already moved to the SPT path for this (S,G).

Thereafter, the RP keeps responding to the periodic NULL register messages received from FHR1 130*a* and FHR2 130*b* by sending (S,G) PIM stop register packet(s) back to the respective FHR. By this time, both FHR1 130*a* and FHR2 130*b* will likely be in suppress states, sending periodic (S,G) NULL PIM register packets towards the RP 140. From this time, every periodic (S,G) NULL PIM register packet sent by either of the FHRs 130*a* or 130*b* will result in changing of (S,G) Register State Machine on the RP 140. Thus, with every periodic (S,G) NULL or non-NULL PIM register packet received the RP 140 from a different FHR address, the RP 140 keeps overwriting its previous Register State Machine with information relevant to the latest FHR. Such inconsistent (S,G) Register State Machine can cause a number of problems, at least some of which are summarized below.

The procedure for FHR-RP interactions under RFC 4601, described above with respect to FIGS. 1A-1G has a serious functionality impact on PIM-ASM networks. For example, problems may include:

Inconsistent Register States on the RP 140 for the selected FHR address. Continuous changes will be observed for Register State Machine on RP 140, with RP's Register State pointing to the most recent FHR with each new (S,G) PIM register packet.

Performance of the RP's CPU will be negatively impacted since the RP 140 will be busy processing and overwriting the Register State Machines continuously.

The MSDP protocol uses Register State Machines to know about the Active Multicast Source. MSDP sends Source Active refresh messages to MSDP peers on a periodic basis to inform them about the Source availability. Since, the Register State Machines are being overwritten on RP 140, it becomes an overhead on the MSDP protocol (and on resources used by the MSDP protocol) to keep refreshing the Source Active messages more frequently.

The RP 140 may forward duplicate traffic received on the decapsulation tunnel interface. Duplicates may be observed from the RP 140 if it receives (S,G) data PIM register packets from different FHRs, before switchover to the SPT is performed. Consider the following scenario— a) FHR1 130*a* sends an (S,G) data PIM register towards the RP 140 and is waiting for the (S,G) stop PIM register packet from the RP 140.
b) The RP 140 has sent an (S,G) join PIM register packet on native PIM interface towards FHR1 130*a* and is waiting for traffic to arrive on the SPT path.
c) Before native traffic arrives on the RP, it receives an (S,G) data PIM register packet(s) for the same (S,G) from FHR2 130*b*. Since the SPT bit is not yet set, the RP 140 will simply forward this traffic since it is received on tunnel interface.
d) If there are n-FHRs that send a data PIM register packet to the RP 140 for the same (S,G) before the SPT switch, n-times duplicate traffic will be forwarded from the RP 140.

On failure of a current FHR, a significant traffic loss may be observed while switching to the Register State Machine of a new FHR. The RP 140 cleans up the existing Register State Machine and moves from a "Receive" state to "No Info" state. RP now has to wait until it forms a new Register State Machine with the new FHR, before accepting multicast traffic from it. This will result in significant traffic loss during the transition period.

As should be appreciated from the foregoing, it would be useful for an RP to better manage (e.g., store, overwrite, delete, etc.) (S,G) state information, especially in network topologies in which a multicast source can have more than one FHR, and especially in network topologies in which the FHR for a multicast source is expected to change fairly frequently.

§ 2. SUMMARY OF THE INVENTION

Example embodiments consistent with the present description support multiple Register State Machines on the RP per (S,G), thereby increasing the Register state consistency and faster convergence in case of FHR failure. Such example embodiments may advantageously eliminate the limitation of a single Register State Machine on RP for a given (S,G), in the presence of multiple FHRs connected to the same source. At least some such example embodiments provide the capability of maintaining multiple Register State Machines on RP for a given (S,G), in a way, that maps one Register State Machine to each FHR. In this way, the RP can avoid the inconsistent FHR states and traffic losses caused due to FHR failures.

An RP may perform a computer-implemented method comprising: (a) responsive to receiving a non-null register message from a first hop router (FHR) between a source (S) of the multicast group (G) and the rendezvous point router, determining whether or not there is already register state information for the source,multicast group (S,G) pair; (b) responsive to a determination that there is not already register state information including a "selected" first hop router, for the source,multicast group (S,G) pair, (1) generating and storing register state information for the source, multicast group (S,G) pair, the register state information including (i) an Internet Protocol (IP) address of the multicast group (G), (ii) an IP address of the source (S), (iii) an Internet protocol address of the first hop router, wherein the first hop router is identified as a selected first hop router, and (iv) at least one timer associated with the first hop router, (2) de-encapsulating multicast data within the non-null register message and forwarding the de-encapsulated multicast data on any interfaces included in a downstream interface list associated with the (S,G) pair or associated with a (*,G) pair, (3) creating a reverse path forwarding (RPF) route to the first hop router and identifying a corresponding interface as a native PIM interface, (4) installing a unicast de-encapsulation route and identifying a corresponding PIM de-encapsulation interface so that a forwarding plane of rendezvous point router can (i) de-encapsulate any incoming non-null register messages and (ii) forward native multicast data contained within the incoming non-null register messages, and (5) sending an (S,G) join message towards the first hop router via the native PIM interface, and otherwise, responsive to a determination that there is already register state information including a "selected" first hop router, for the source,multicast (S,G) pair, (1) updating the stored register state information for the source,multicast group (S,G) pair, by adding, (i) an IP address of the first hop router, wherein the first hop router is not identified as a selected first hop router, and (ii) at least one timer associated with the first hop router, without overwriting any previously stored register state information for the source,multicast group (S,G) pair, (2) sending an (S,G) register stop message towards the first hop router, and (3) dropping the multicast payload data contained in the non-null register message; (c) responsive to receiving, on the native PIM interface, native multicast traffic from the source, (1) forwarding the multicast packet to any receivers, that were previously registered with the multicast group, via previously established shared trees, (2) updating the multicast route with a reverse path forwarding interface as the upstream interface for the source,multicast group (S,G) pair, and (3) sending an (S,G) register stop message towards the first hop router; and (d) responsive to receiving each of periodic (S,G) null register messages from any first hop router, sending an (S,G) register stop message towards the first hop router that sourced the (S,G) null register message.

§ 3. BRIEF DESCRIPTION OF THE DRAWINGS

FIG. 3 is a flow diagram of an example method for generating and storing register state information for a "selected" FHR for an (S,G) group in a manner consistent with the present description.

FIG. 4 is a flow diagram of an example method for generating and storing register state information for a "non-selected" FHR for an (S,G) group in a manner consistent with the present description.

FIGS. 10A and 10B illustrate example packet forwarding operations of the example distributed ASICs of FIG. 9.

§ 4. DETAILED DESCRIPTION

Figure 1A:
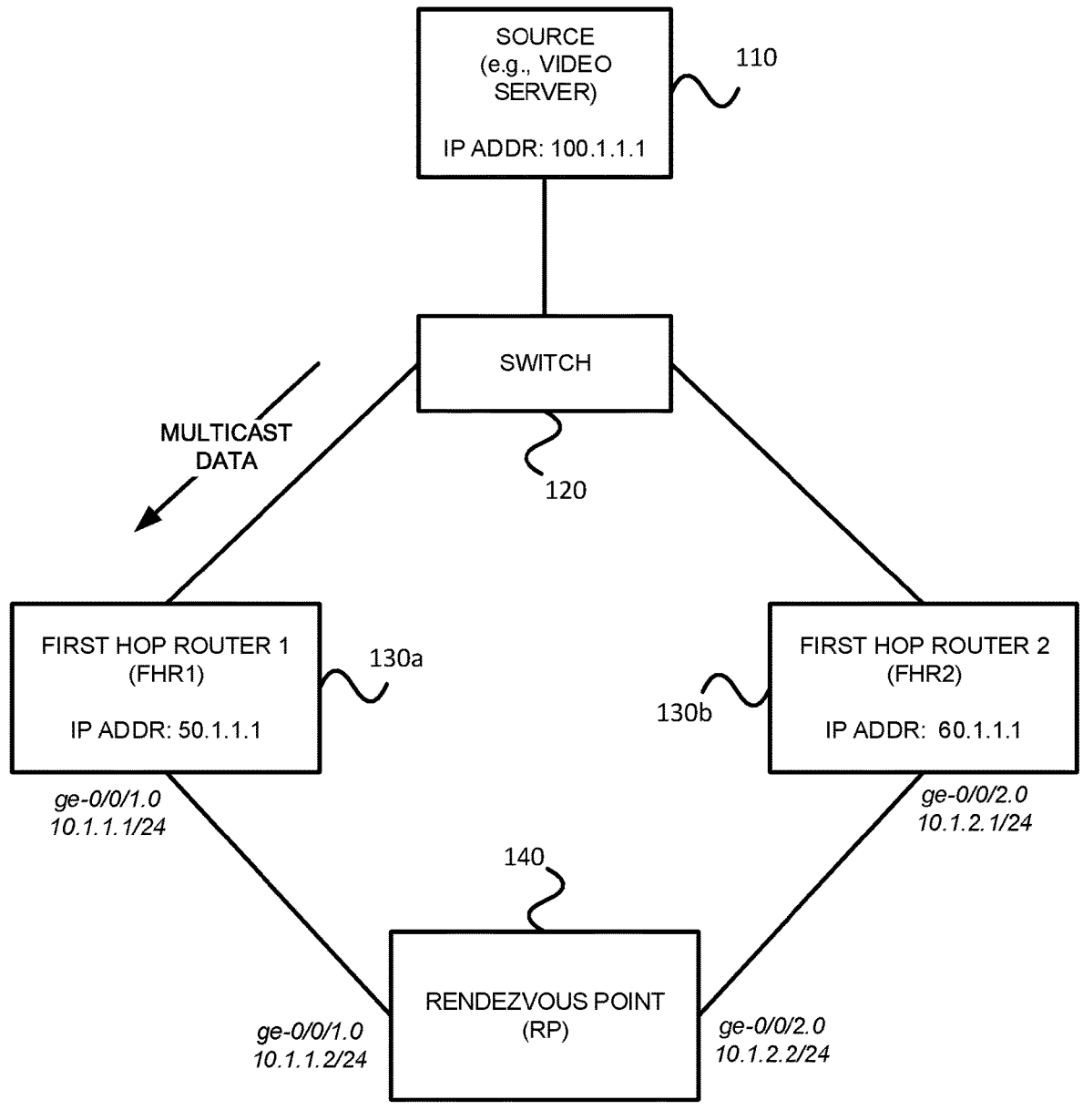
FIGS. 1A-1G illustrate a problem with the PIM-SM protocol when a source has more than one first hop router (FHR).

Example embodiments consistent with the present description may involve novel methods, apparatus, and data structures for processing by a rendezvous point router in the context of PIM-SM. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Definitions

The following terms may be used in this application, and may have special significance for PIM-SM.

Rendezvous Point ("RP"): An RP is a router that has been configured to be used as the root of the non-source specific distribution tree for a multicast group. Join messages from receivers for a group are sent towards the RP, and data from senders is sent to the RP so that receivers can discover who the senders are and start to receive traffic destined for the group.

Designated Router ("DR"): A shared-media LAN like Ethernet may have multiple PIM-SM routers connected to it. A single one of these routers, the DR, will act on behalf of directly connected hosts with respect to the PIM-SM protocol. A single DR is elected per interface (LAN or otherwise) using a simple election process.

Multicast Routing Information Base ("MRIB"): This is the multicast topology table, which is typically derived from the unicast routing table, or routing protocols such as Multiprotocol BGP ("MBGP") that carry multicast-specific topology information. In PIM-SM, the MRIB is used to decide where to send Join/Prune messages. A secondary function of the MRIB is to provide routing metrics for destination addresses; these metrics are used when sending and processing Assert messages.

Reverse Path Forwarding ("RPF"): The RPF Neighbor of a router with respect to an address is the neighbor that the MRIB indicates should be used to forward packets to that address. In the case of a PIM-SM multicast group, the RPF neighbor is the router that a Join message for that group would be directed to, in the absence of modifying Assert state.

Tree Information Base ("TIB"): This is the collection of state at a PIM router that has been created by receiving PIM Join/Prune messages, PIM Assert messages, and Internet Group Management Protocol ("IGMP") or Multicast Listener Discovery ("MLD") information from local hosts. It essentially stores the state of all multicast distribution trees at that router.

Multicast Forwarding Information Base ("MFIB") The TIB holds all the state that is necessary to forward multicast packets at a router. However, although this specification defines forwarding in terms of the TIB, to actually forward packets using the TIB is very inefficient. Instead, a real router implementation will normally build an efficient MFIB from the TIB state to perform forwarding. How this is done is implementation-specific and is not discussed in this document.

Upstream: Towards the root of the tree. The root of tree may be either the source or the RP, depending on the context.

Downstream: Away from the root of the tree.

Generation Identifier ("GenID"): used to detect reboots.

PIM Multicast Border Router ("PMBR"): A router joining a PIM domain with another multicast domain.

As used in this application the terms (*,G) PIM join/prune/stop message, or (S,G) PIM join/prune/stop message are equivalent to the terms PIM (*,G) join/prune/stop message, or PIM (S,G) join/prune/stop message and are equivalent to the terms PIM (*,G) join/prune/stop register message, or PIM (S,G) join/prune/stop register message. In some instances, "packet" is used in place of the more general term "message."

§ 4.2 Example Rendezvrous Point (RP) Processing Method(s)

An RP consistent with the present description eliminates the limitation of a single Register State Machine on RP for a given (S,G), in the presence of multiple FHRs connected to the same source. More specifically, an RP consistent with the present description is provided with the capability of maintaining multiple Register State Machines for a given (S,G), in a way, that maps one Register State Machine to each FHR. No changes are needed on the FHR(s).

Figure 2:
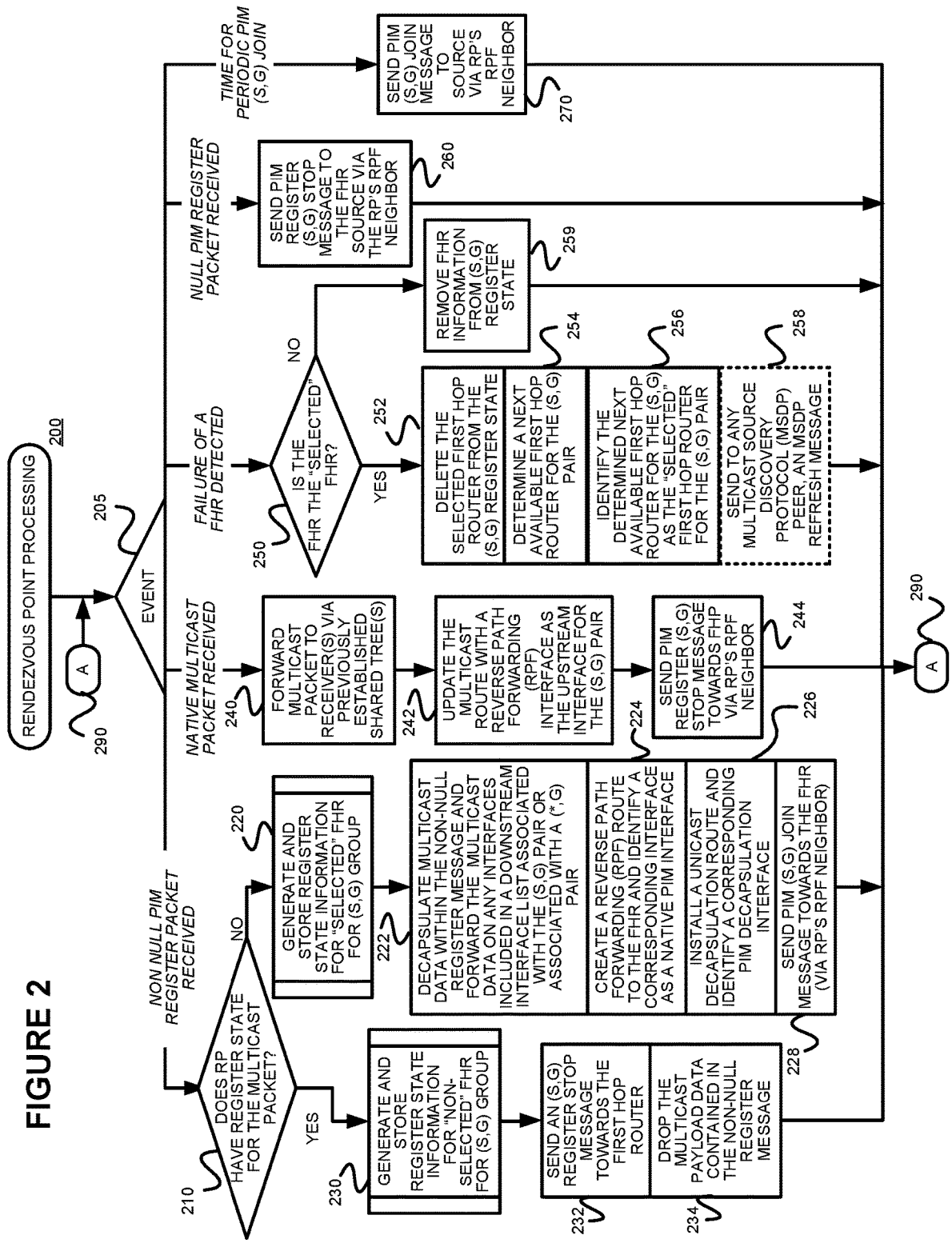
FIG. 2 is a flow diagram of example method for use by an RP for a PIM multicast group (G).

FIG. 2 is a flow diagram of example method 200 for use by a rendezvous point router ("RP") for a protocol independent multicast (PIM) multicast group (G). Different branches of the example method 200 are performed in response to different events, as indicated by event element 205. Referring first to the left most branch, responsive to receiving a non-null PIM register message from a FHR between a source (S) of the multicast group (G) and the RP, the RP determines whether or not there is already register state information for the source, multicast group (S,G) pair. (Decision point 210) Responsive to a determination that there is not already register state information including a "selected" FHR (Decision point 210, NO) for the source, multicast group (S,G) pair, the example method 200 generates and stores register state information for the source, multicast group (S,G) pair (Block 220). An example method 300 for generating and storing register state information for a "selected" FHR for the (S,G) group is illustrated in FIG. 3.

Referring to FIG. 3, an example method 300 generates and stores, as (S,G) state information (also referred to as "register state"), (1) an Internet Protocol (IP) address of the multicast group (G) (Block 310), (2) an IP address of the source (S) (Block 320), (3) an Internet protocol address of the FHR, wherein the FHR is identified as a selected FHR (Block 330), and (4) at least one timer associated with the FHR (Block 340). Processing is then returned back to block 222 of FIG. 2. (Return node 350)

Referring now to FIG. 2, the example method 200 de-encapsulates multicast data within the non-null register message and forwards the de-encapsulated multicast data on any interfaces included in a downstream interface list associated with the (S,G) pair or associated with a (*,G) pair. (Block 222). Further, the example method 200 creates an RPF route to the first hop router and identifies a corresponding interface as a native PIM interface. (Block 224) Furthermore, the example method 200 installs a unicast de-encapsulation route and identifies a corresponding PIM de-encapsulation interface so that a forwarding plane of rendezvous point router can (i) de-encapsulate any incoming non-null register messages and (ii) forward native multicast data contained within the incoming non-null register messages. (Block 226) Furthermore, the example method 200 sends an (S,G) PIM join message towards the first hop router via the native PIM interface. (Block 228). Processing then continues back to event element 205 via node 290.

Referring back to decision point 210, responsive to a determination that there is already register state information including a "selected" FHR, for the source,multicast group (S,G) pair (Decision point 210, YES), the example method 200 generates and stores register state information for the "non-selected" FHR for the (S,G) group. (Block 230) That is, referring to FIG. 4, the example method 400 may be used to update (not overwrite) the stored register state information for the source,multicast group (S,G) pair, by adding, (1) an IP address of the FHR, wherein the FHR is not identified as a selected FHR (Block 410) and (2) at least one timer associated with the first hop router (Block 420). These acts are performed without overwriting any previously stored register state information for the source,multicast group (S,G) pair. Processing is then returned back to block 232 of FIG. 2. (Return node 430)

Referring now to FIG. 2, the example method 200 sends an (S,G) PIM stop message towards the first hop router. (Block 232). The example method 200 also drops the multicast payload data contained in the non-null register message. (Block 234) Processing then continues back to event element 205 via node 290.

Referring back to event element 205, responsive to receiving, on the native PIM interface, native multicast traffic from the source, the example method 200 forwards the multicast packet to any receivers, that were previously registered with the multicast group, via previously established shared trees. (Block 240) The example method 200 also updates the multicast route with an RPF interface as the upstream interface for the source,multicast group (S,G) pair. (Block 242) Further, the example method 200 sends an (S,G) register stop message towards the FHR (e.g., via the RP's RPF neighbor). (Block 244) Processing then continues back to event element 205 via node 290.

Referring back to event element 205, assume a FHR failure is detected. The example method 200 determines whether or not the FHR which failed is the "selected" FHR. (Decision point 250) Responsive to determining that the failed FHR for the (S,G) pair is the "selected" FHR (that is, responsive to determining that the "selected" FHR for the (S,G) pair failed) (Decision point 250, YES), the example method 200 deletes the selected FHR entry from the register state information for the (S,G) pair (Block 252), determines a next available FHR for the (S,G) pair (Block 254), and identifies the determined next available FHR for the (S,G) pair (assuming there is one) as the "selected" FHR for the (S,G) pair (Block 256). Further, as appropriate, the example method 200 may send to any multicast source discovery protocol ("MSDP") peer, an MSDP refresh message. (Block 258) Referring back to decision block 250, if the failed FHR is not the "selected" FHR, the method 200 may simply remove the FHR information about the failed FHR from the (S,G) register state. (Block 259) Processing then continues back to event element 205 via node 290.

Note that a failure of a FHR for the (S,G) pair may be detected when a link failure towards the FHR for the (S,G) pair is detected. Also, a failure of a FHR for the (S,G) pair may be detected when a timeout of all (S,G) register state machines for the first hop router for the (S,G) pair is detected. In the latter case, a timeout of all (S,G) register state machines for a FHR for the (S,G) pair occurs when no null register messages are received for a period defined by the timer associated with the FHR.

Referring back to block 254, it was assumed that there was a next available FHR when the "selected" FHR fails. However, this is not necessarily true. Therefore, in one embodiment, the example method 200 determines whether or not there is register state information for another FHR for the (S,G) pair, and responsive to determining that there is register state information for another FHR for the (S,G) pair, (1) determines a next available FHR for the (S,G) pair, and (2) identifies the determined next available FHR for the (S,G) pair as the "selected" FHR for the (S,G) pair. Otherwise, responsive to determining that there is no other FHR for the (S,G) pair, the example method 200 performs a cleanup of the register state information for the (S,G) group. Any necessary MSDP message(s) may also be sent.

Referring again to event element 205, responsive to receiving each of periodic (S,G) null register messages from any FHR, the example method 200 sends an (S,G) register stop message towards the FHR that sourced the (S,G) null register message. (Block 260)

The RP may perform other aspects of the PIM-SM protocol in a normal manner. For example, if it is time for a periodic (S,G) PIM join, the example method 200 sends the (S,G) PIM join message to the source (S) via the RP's RPF neighbor. (Block 270)

As should be appreciated from the foregoing description, the RP may be modified so that it maintains a list of FHR states per (S,G). (Recall, e.g., blocks 220 and 230) The first FHR to send the data (i.e., non-null) PIM register packet will be marked or otherwise identified as the "selected" FHR. (Recall, e.g., 330 and FIG. 3.) Only for this "selected" FHR, will the RP create a unicast decapsulation route and install a multicast route with RPF interface as PIM-decapsulation interface. (Compare FIGS. 3 and 4.) The RP will then send (S,G) PIM join message towards the source (Recall, e.g., block 228.) and will wait for traffic to arrive on native PIM interface before sending an (S,G) PIM stop message towards the selected FHR (Recall, e.g., block 244.).

Any new FHR sending a data (i.e., non-Null) PIM register packet will be marked as a secondary FHR (or otherwise not identified as the "selected" FHR). (Recall, e.g., 410 and FIG. 4.) For all the secondary FHRs, RP will just add this FHR state to the list of Register State Machine for that (S,G) and immediately send out an (S,G) PIM stop message (Recall, e.g., block 232.), thereafter only responding with PIM register stop message to periodic NULL PIM register messages.

The data (i.e., non-null) PIM register packet received from the secondary FHR will not be forwarded out and simply be dropped. (Recall, e.g., block 234.) This will avoid the problem of duplicate traffic.

If the RP participates in MSDP, it will send MSDP SA refresh messages only on the refresh of the selected FHR state machine. (Recall, e.g., block 258.)

On failure of any FHR, it will be simply deleted from the list of Register states. (Recall, e.g., blocks 252 and 259.) If the list of Register State Machines becomes empty, the RP will clean up the Register State Machine and (S,G) node as per the PIM-ASM RFC. However, if the list is still pointing to some FHR state machine, no cleanup action will be taken, and the next available FHR will be marked (or otherwise identified) as the "selected" FHR. (Recall, e.g., block 256.)

§ 4.3 Example Register State Information for an (S,G) Pair

Figure 5:
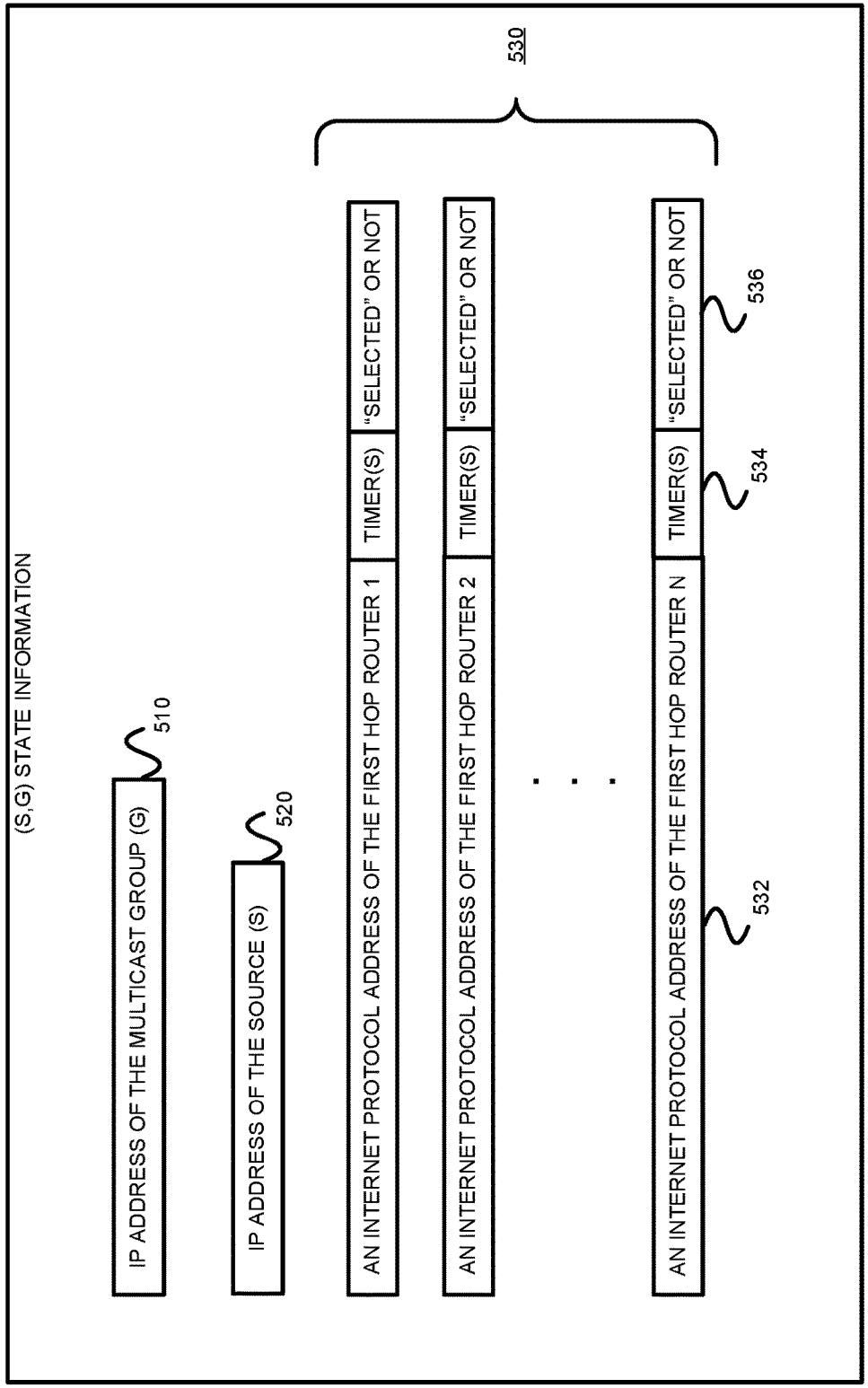
FIG. 5 illustrates (S,G) state information that may be stored by a rendezvous point router in a manner consistent with the present description.

FIG. 5 illustrates example (S,G) state information 500 that may be stored by a rendezvous point router (RP) in a manner consistent with the present description. As shown, the example (S,G) state information 500 may include the IP address of the multicast group (G) 510, the IP address of the multicast source (S) 520, and one or more entries for one or more first hop router(s) (FHR(s)) 530. Each entry for the one or more FHR includes an IP address of the FHR 532, one or more timers associated with the FHR 534, and whether or not the FHR is the "selected" FHR 536. The field 536 may be a single bit in one example data structure. Thus, an FHR may be identified as the "selected" FHR in the register state information for the source,multicast group (S,G) pair stored by marking the FHR as the "selected" first hop router.

§ 4.4 Example of Operations by an Example Rendezvous Point (RP) Router

FIGS. 6A-6G illustrate operations of the example method 200 of FIG. 2 by a rendezvous point router (RP) in the context of the PIM-SM protocol when a source has more than one first hop router (FHR). As will be appreciated from the following example, an example RP consistent with the present description can avoid the inconsistent FHR states, and can avoid traffic losses caused due to FHR failures.

Referring to FIGS. 6A-6G, consider a PIM topology in which both FHR1 130a and FHR2 130b receive traffic from the same source 110 and form Register State Machine with a common RP 640. The distribution tree(s) from the RP 640 to any receiver(s) are not shown.

Figure 1B:
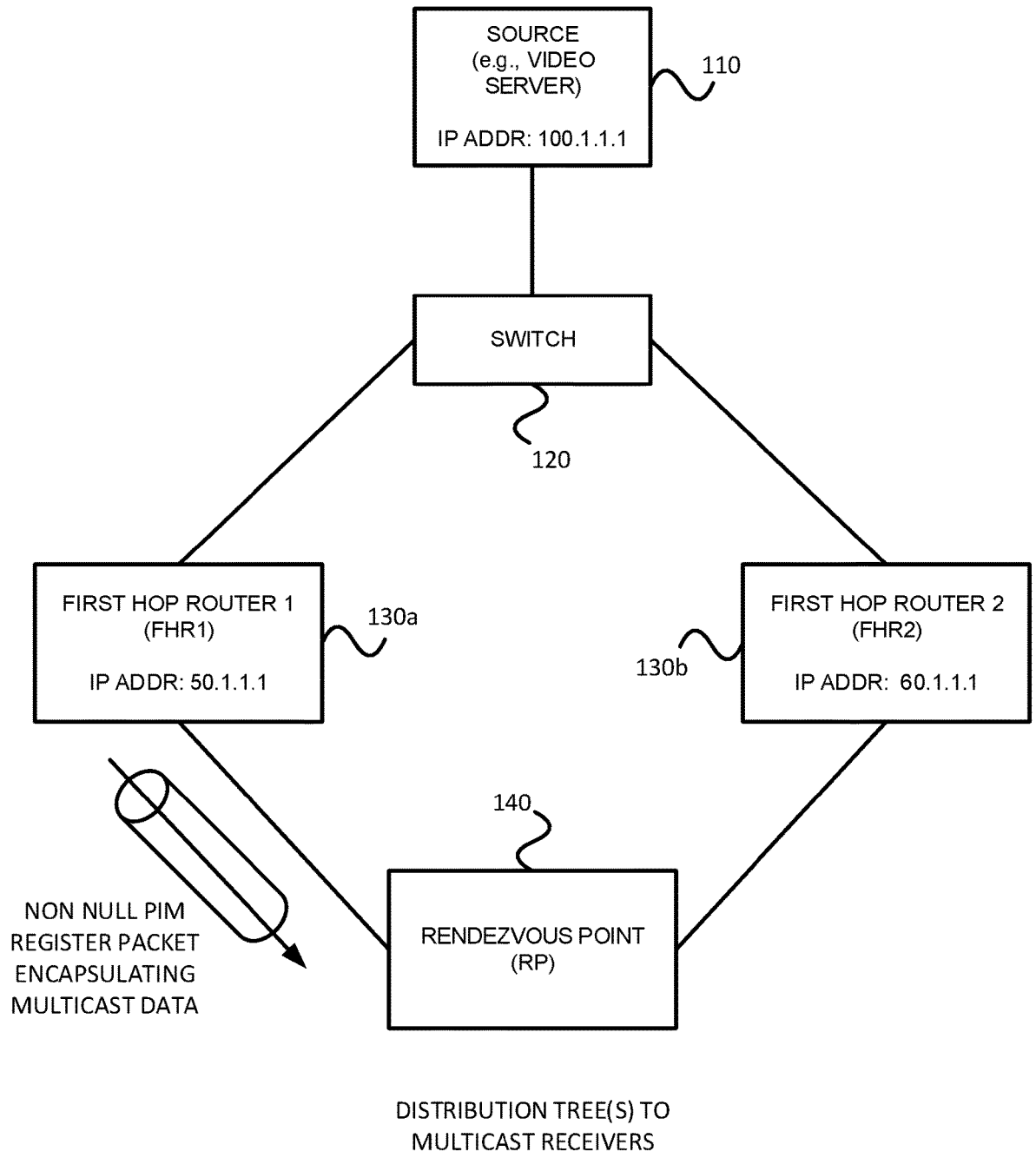
Figure 1C:
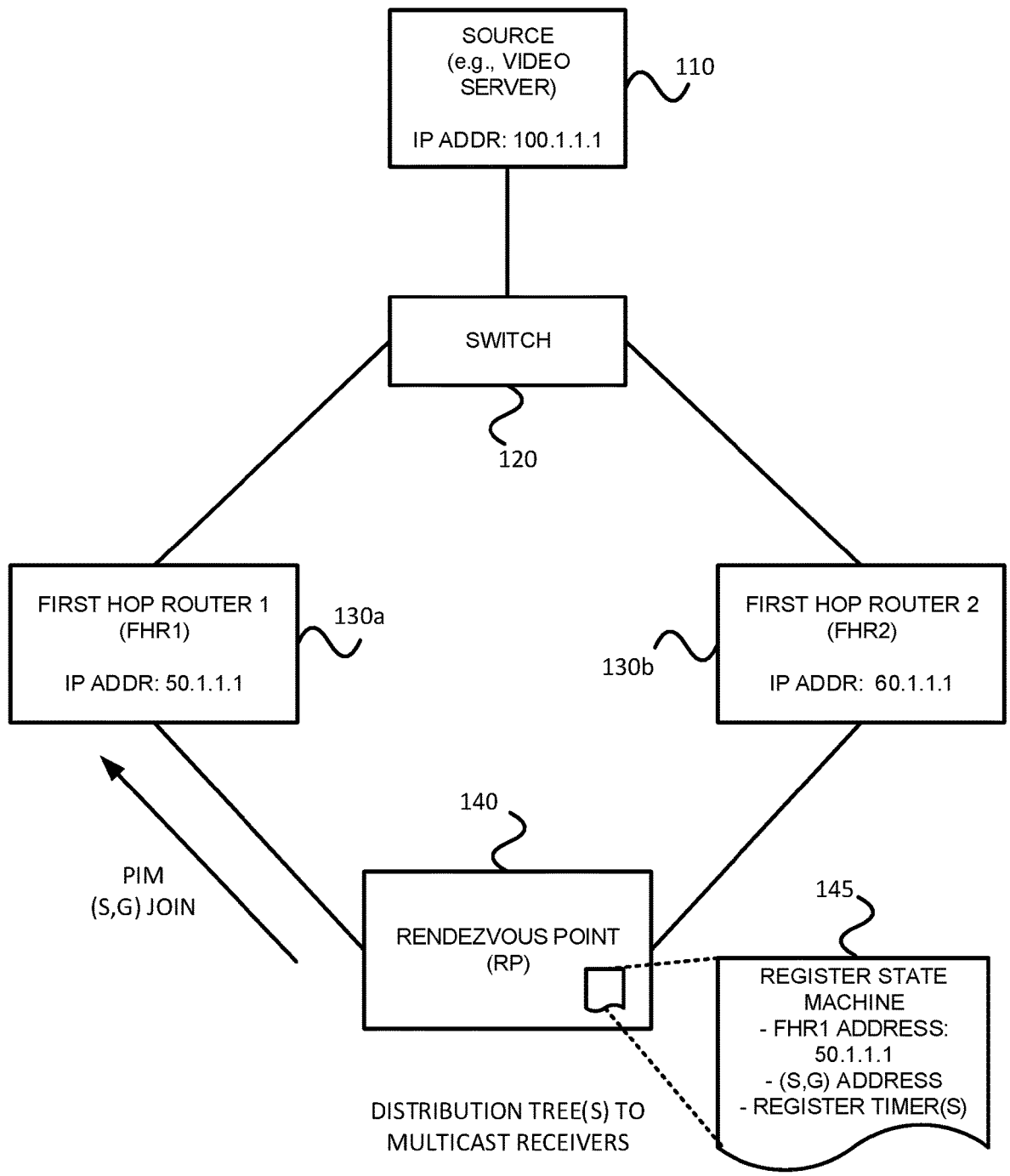
Figure 1D:
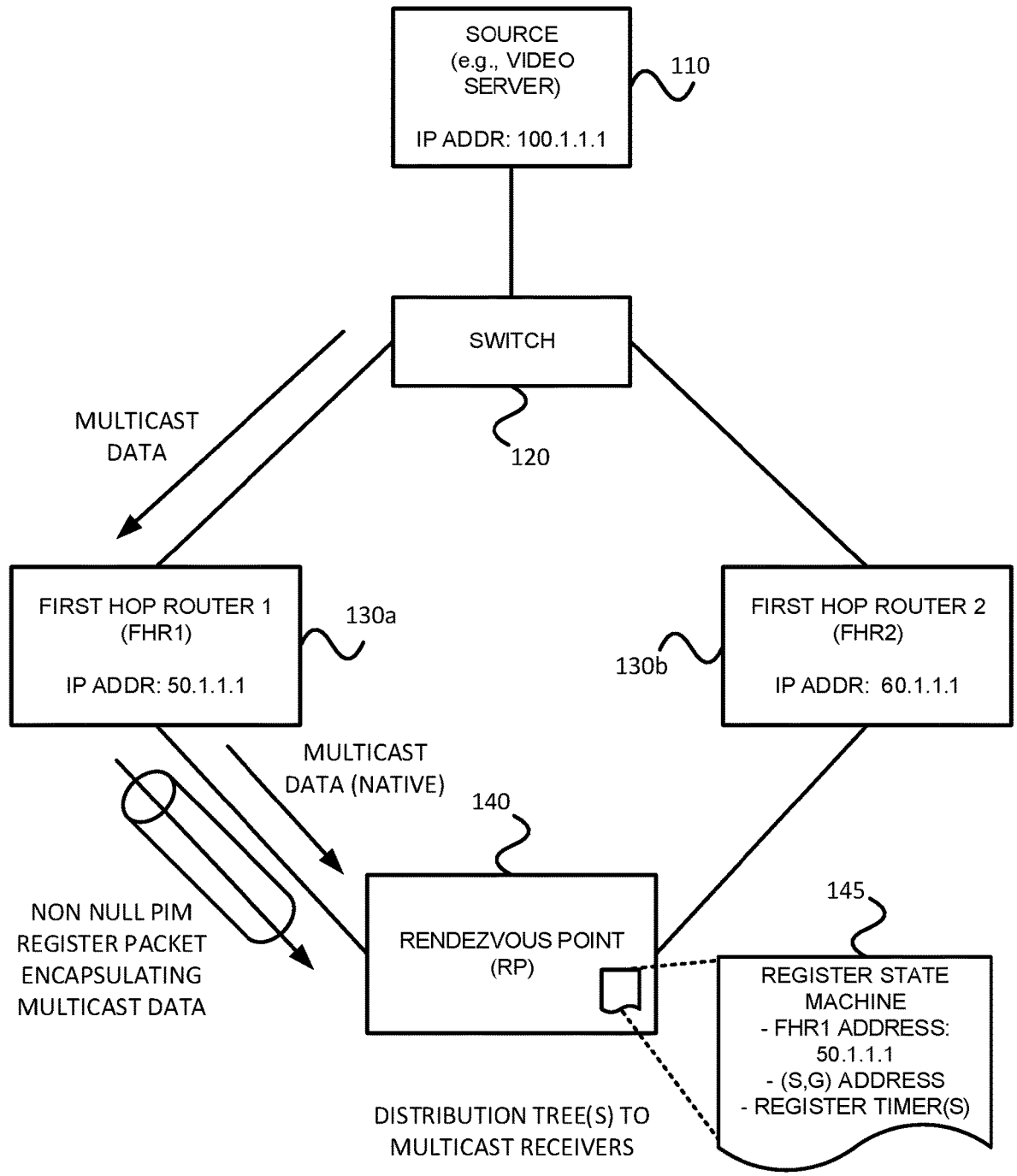
Figure 1E:
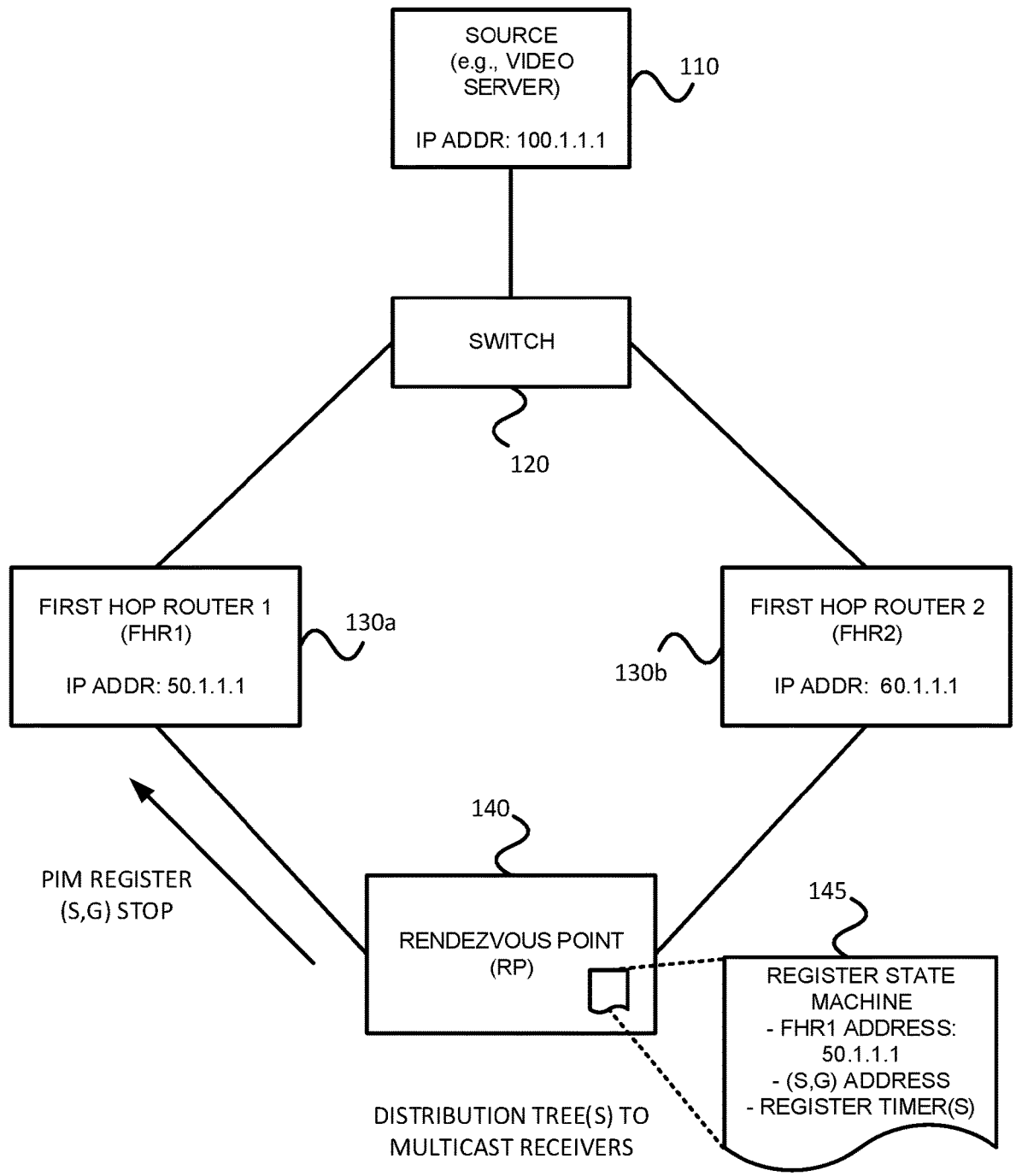
Figure 1F:
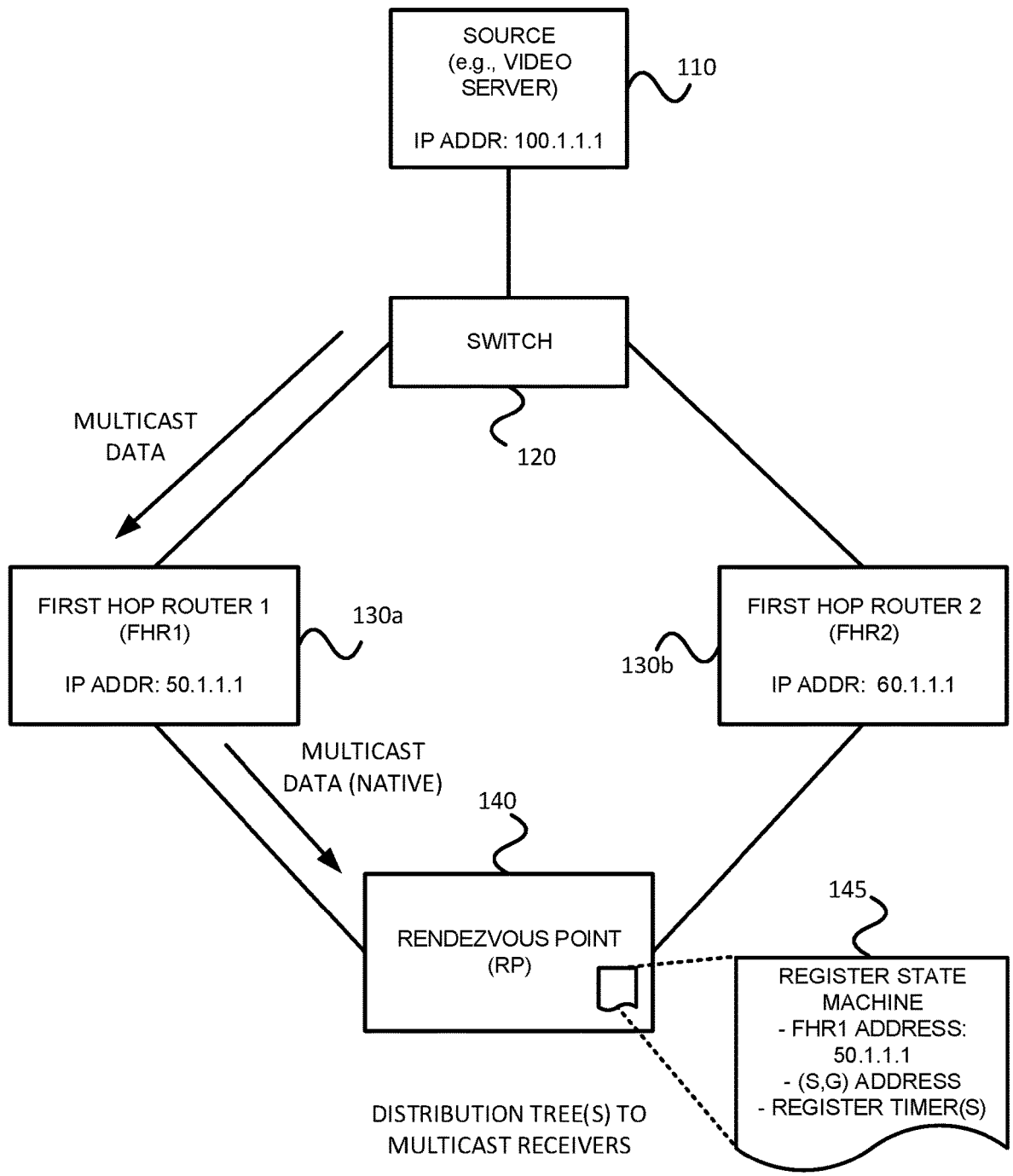
Figure 6A:
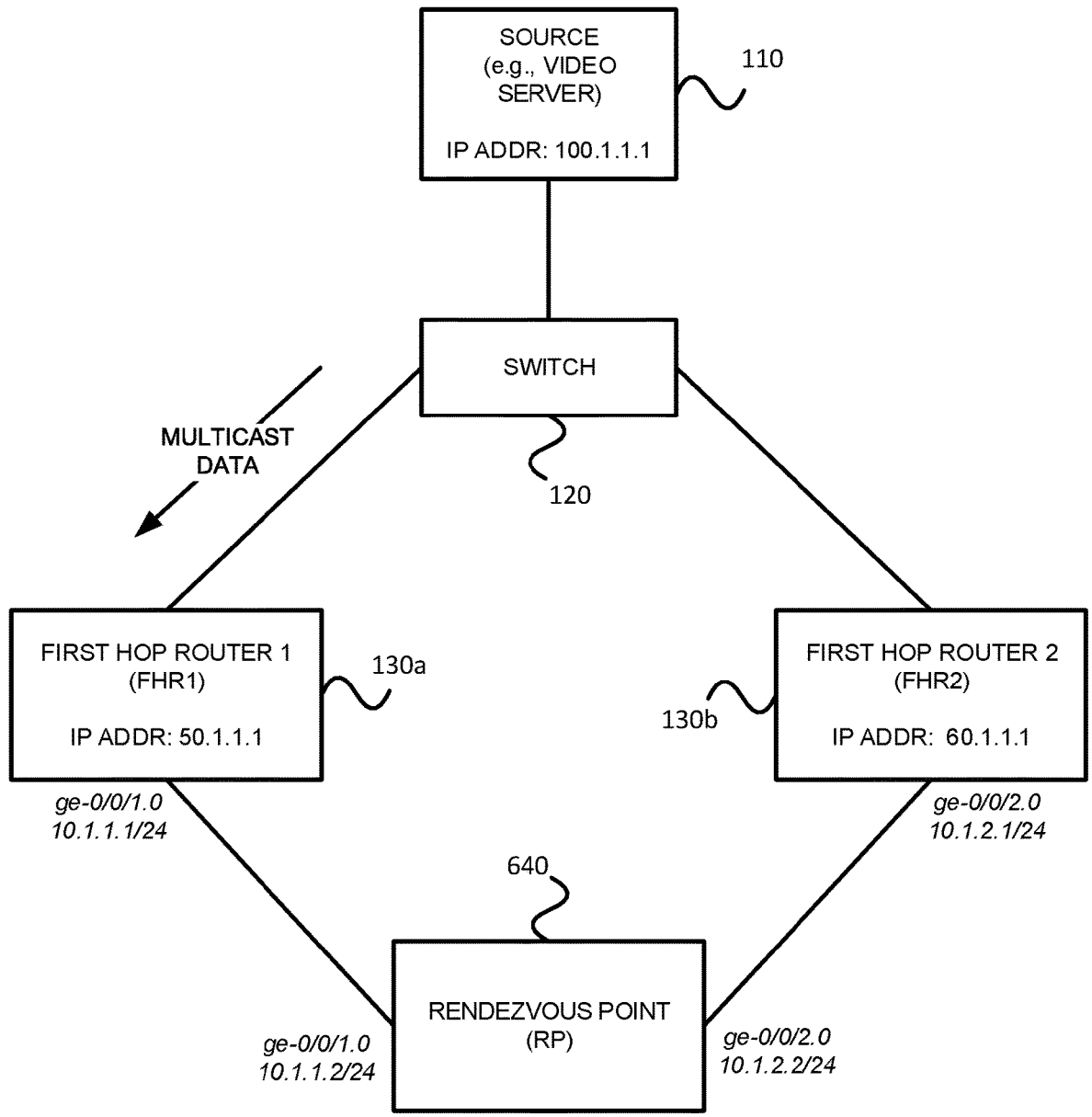
FIGS. 6A-6G illustrate operations of the example method of FIG. 2 by a rendezvous point router in the context of the PIM-SM protocol when a source has more than one FHR.
Figure 6B:
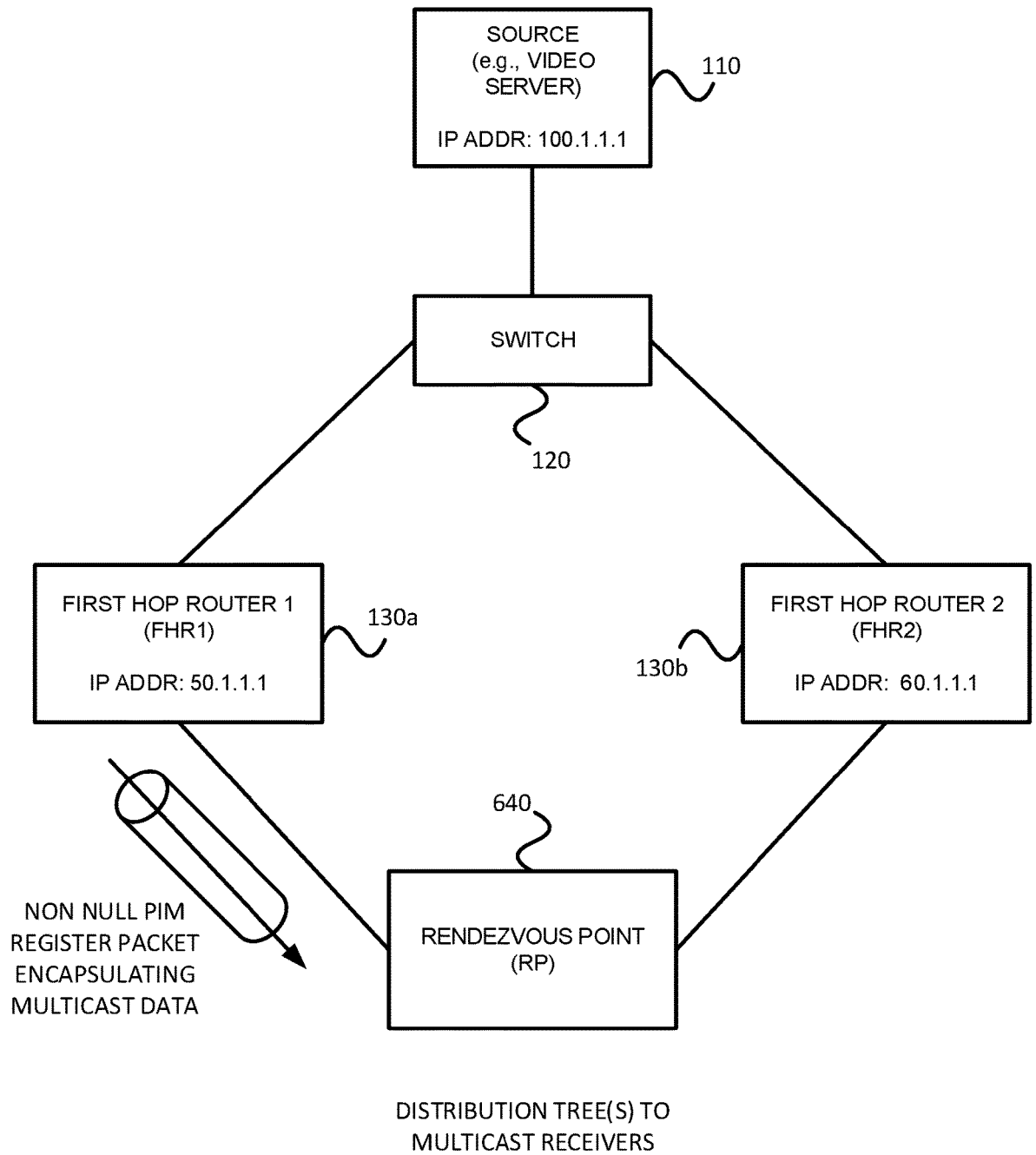
Figure 6C:
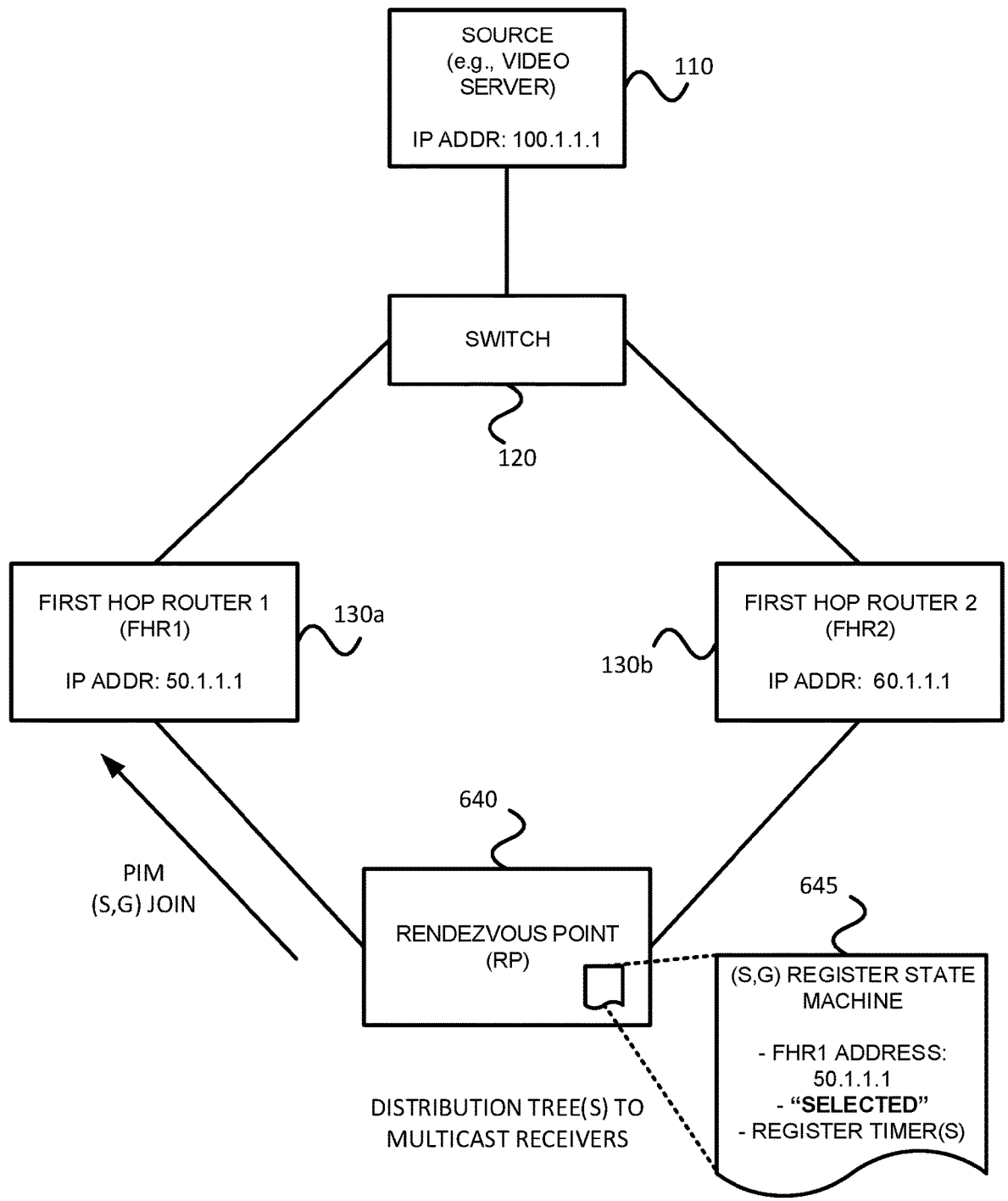

FHR 1 130a receives multicast data (FIG. 6A), encapsulates it and sends it as non-null PIM register packets encapsulating the multicast data. The RP 640 receives a data register packet(s) from FHR1 630a (FIG. 6B). Thus far, FIGS. 6A and 6B correspond to FIGS. 1A and 1B, respectively. Referring to FIG. 6C, upon receiving data register packet(s), RP 640 creates a register state machine 645 with FHR1 130a. As shown, the register state machine 645 includes the (IP) address of FHR1, the (S,G) address and one or more register timer(s). Since FHR 1 130a is the first to send multicast data to the RP 640, the register state machine 645 identifies the FHR 1 130a as the "selected" FHR. (Recall, e.g., block 230 and FIG. 3.) The RP 640 also installs a multicast route with RPF as a PIM-decapsulation interface. (Recall, e.g., block 224.) Still referring to FIG. 6C, the RP 640 then sends an (S,G) PIM join packet towards FHR1 130a (Recall, e.g., block 228.) and waits for traffic to arrive on native PIM interface. Until then, the RP 640 continues to accept traffic on the PIM-decapsulation interface encapsulated within data register packets.

Figure 6D:
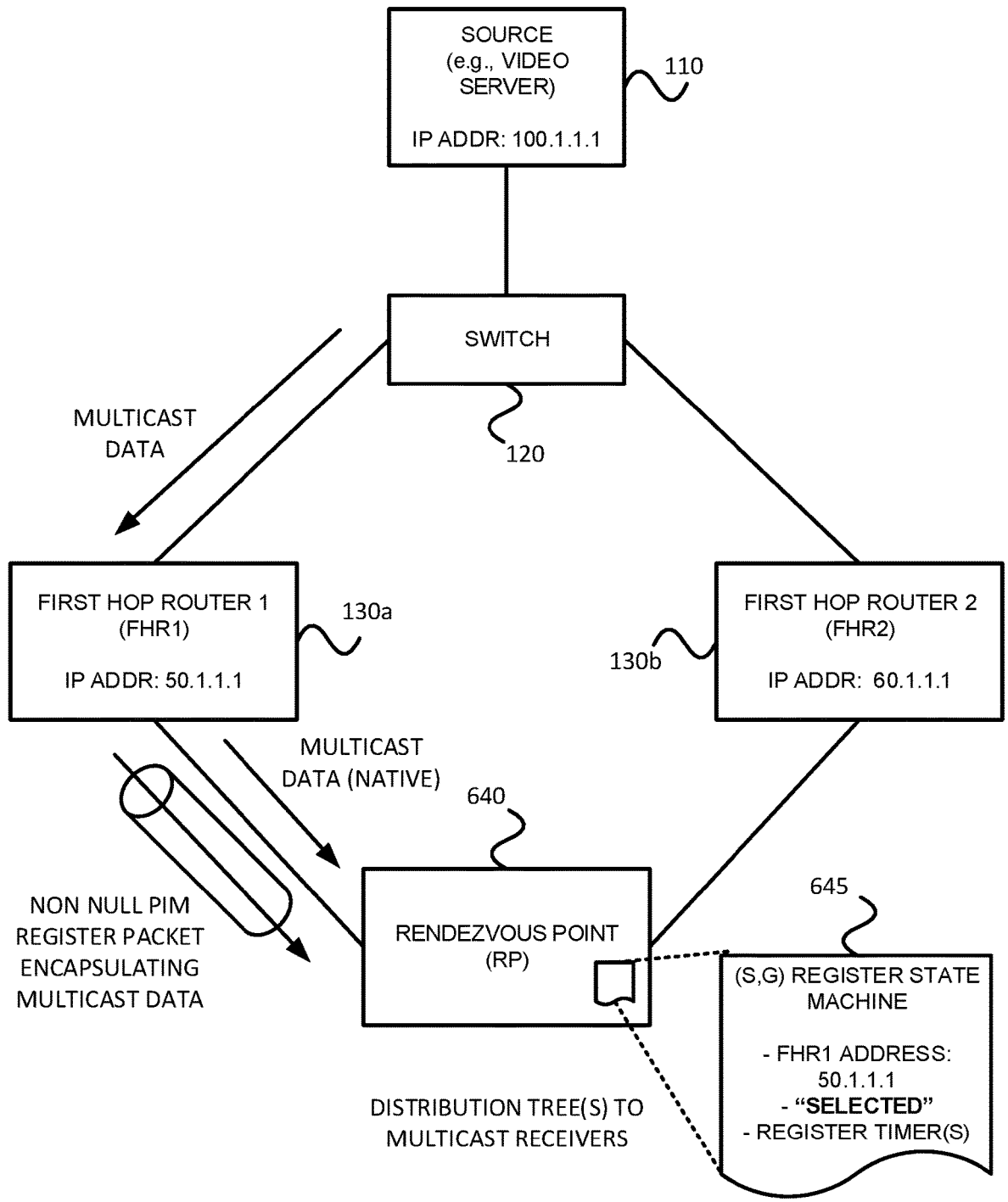
Figure 6E:
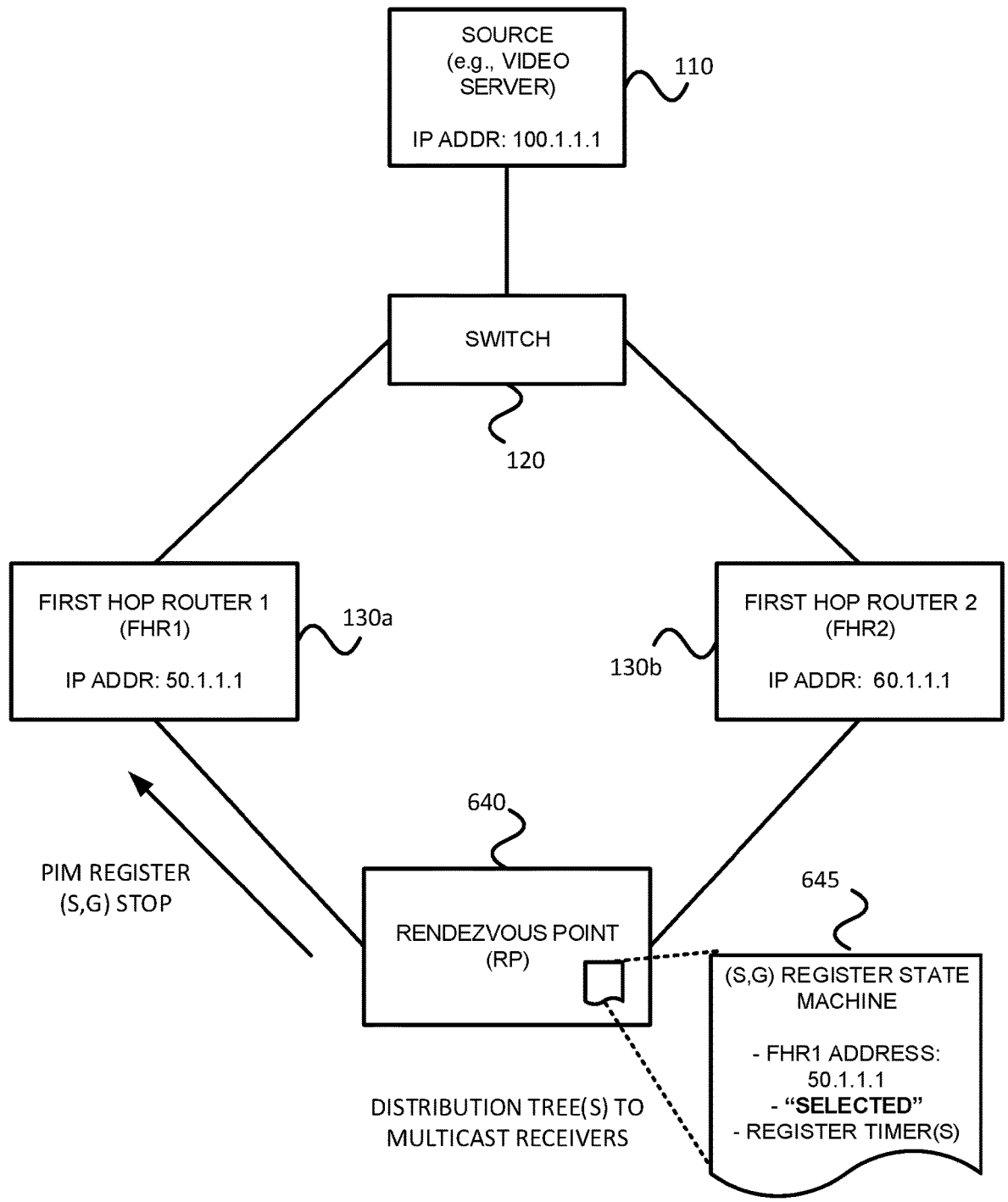
Figure 6F:
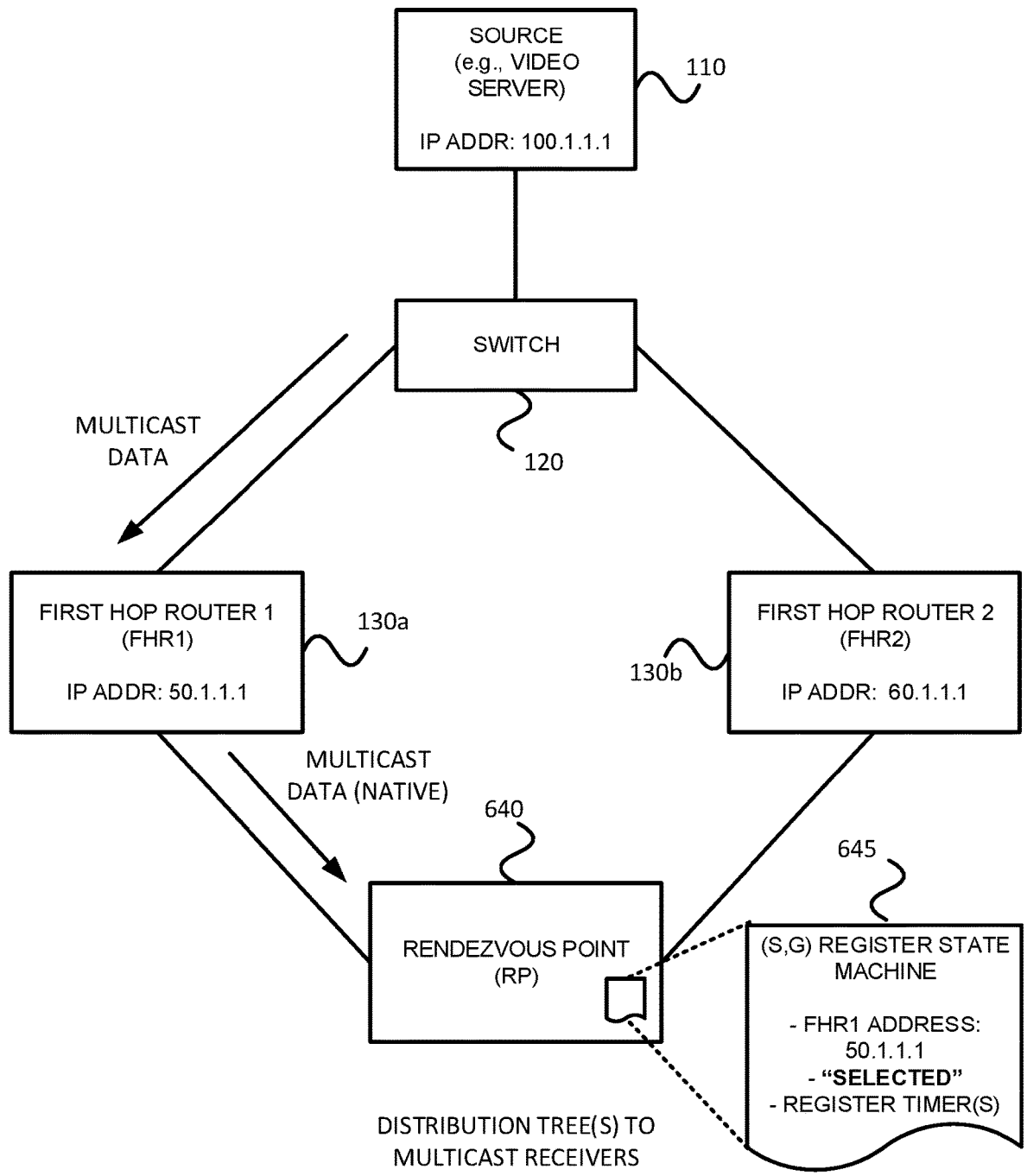

Referring now to FIG. 6D, once the multicast traffic arrives on the native PIM interface, the RP 640 updates the (S,G) multicast route with RPF as native PIM interface. (Recall, e.g., block 242.) Then, as shown in FIG. 6E, the RP 640 sends an (S,G) stop PIM register packet towards FHR1 130a. (Recall, e.g., block 244.) As shown in FIG. 6F, the FHR1 130a can now send multicast data in its native (that is, unencapsulated) form.

Thereafter, the RP 640 keeps responding to the periodic (S,G) NULL register packets received from FHR1 130a by sending an (S,G) PIM stop packet, to maintain the (S,G) register states between RP 640 and FHR1 130a. (Recall, e.g., block 260.)

Figure 1G:
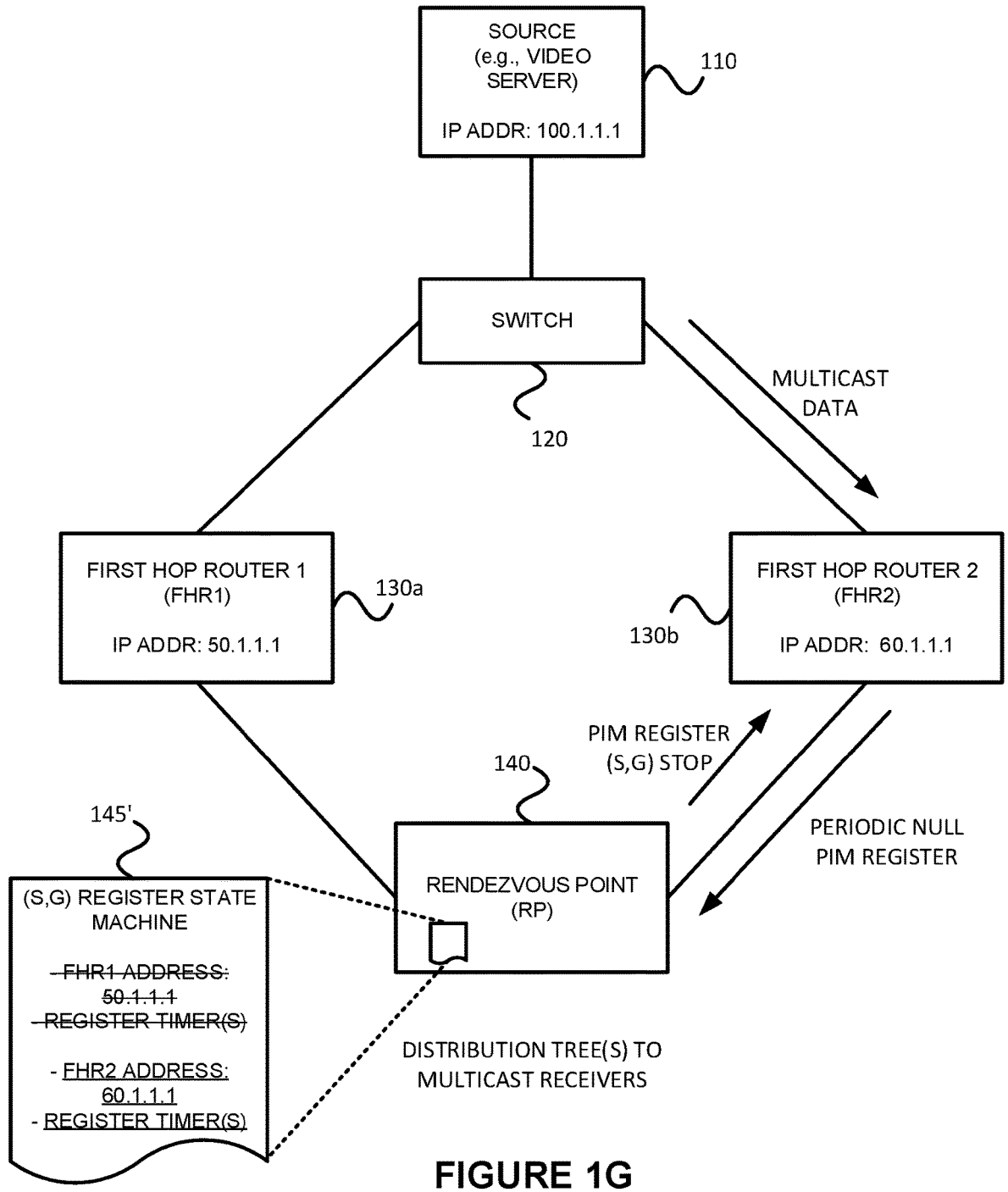
Figure 6G:
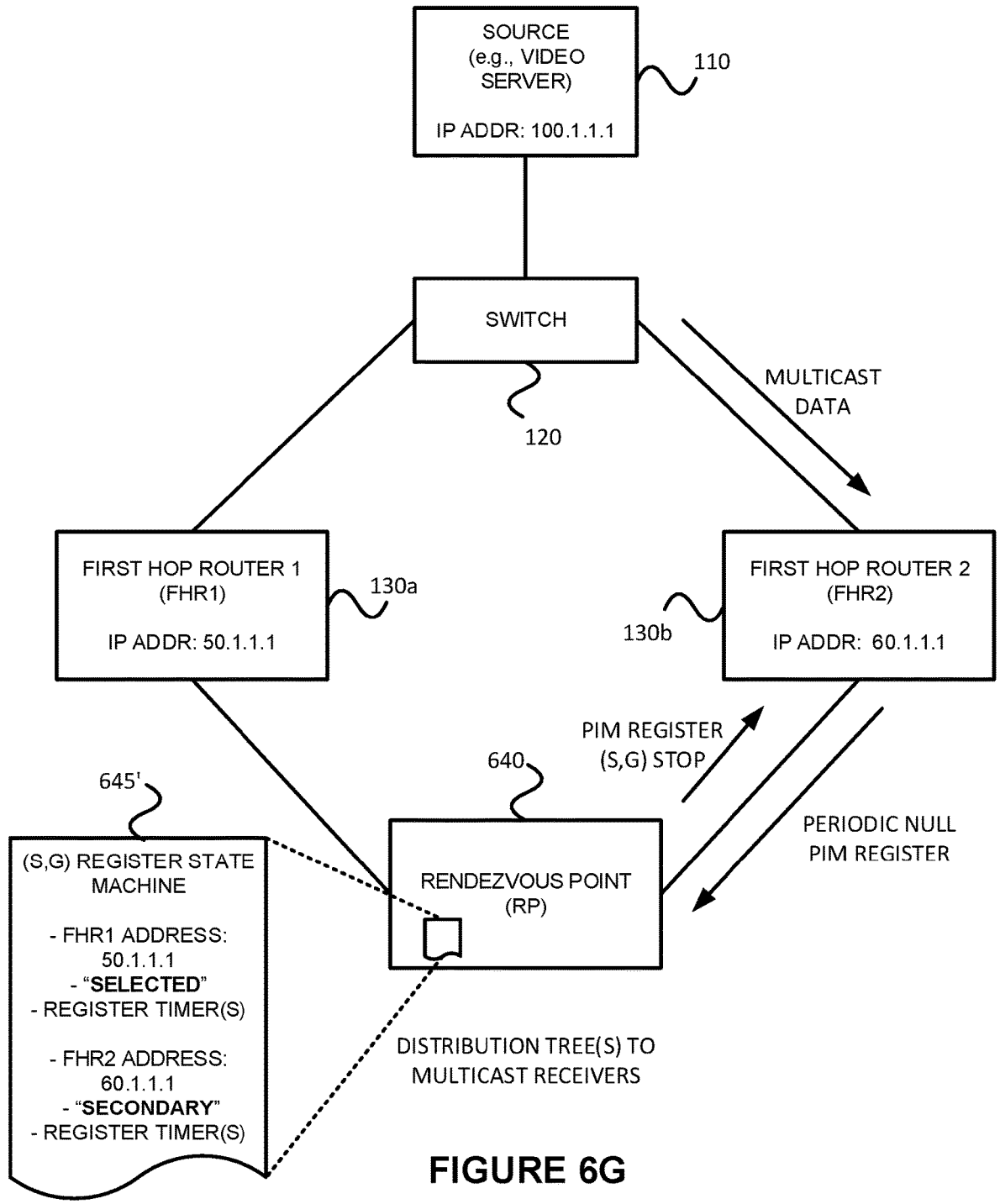

Finally, referring to FIG. 6G, after the RP 640 has already formed (S,G) Register State Machine with FHR1 130a (and identified FHR 1 130a as the "selected" FHR), first hop router 2 (FHR2) 130b receives multicast data, encapsulates it, and sends a data register packet(s) to the RP 640. On receiving data register packet(s) from FHR2 130b, the RP 640 does not perform a cleanup of existing the (S,G) Register State Machine with FHR1 130a (as was the case with FIG. 1G). Rather, the RP 640 updates the (S,G) Register State Machine with FHR2 130b, which is not identified as the "selected" FHR (e.g., it is identified as a "secondary FHR). (Recall, e.g., block 230, FIG. 4 and FIG. 5.) Thus, as illustrated by the example in FIGS. 6A-6G, the example method 200 avoids the problems illustrated by the example in FIGS. 1A-1G.

§ 4.5 Example Rendezvrous Point (RP) Router

Figure 7:
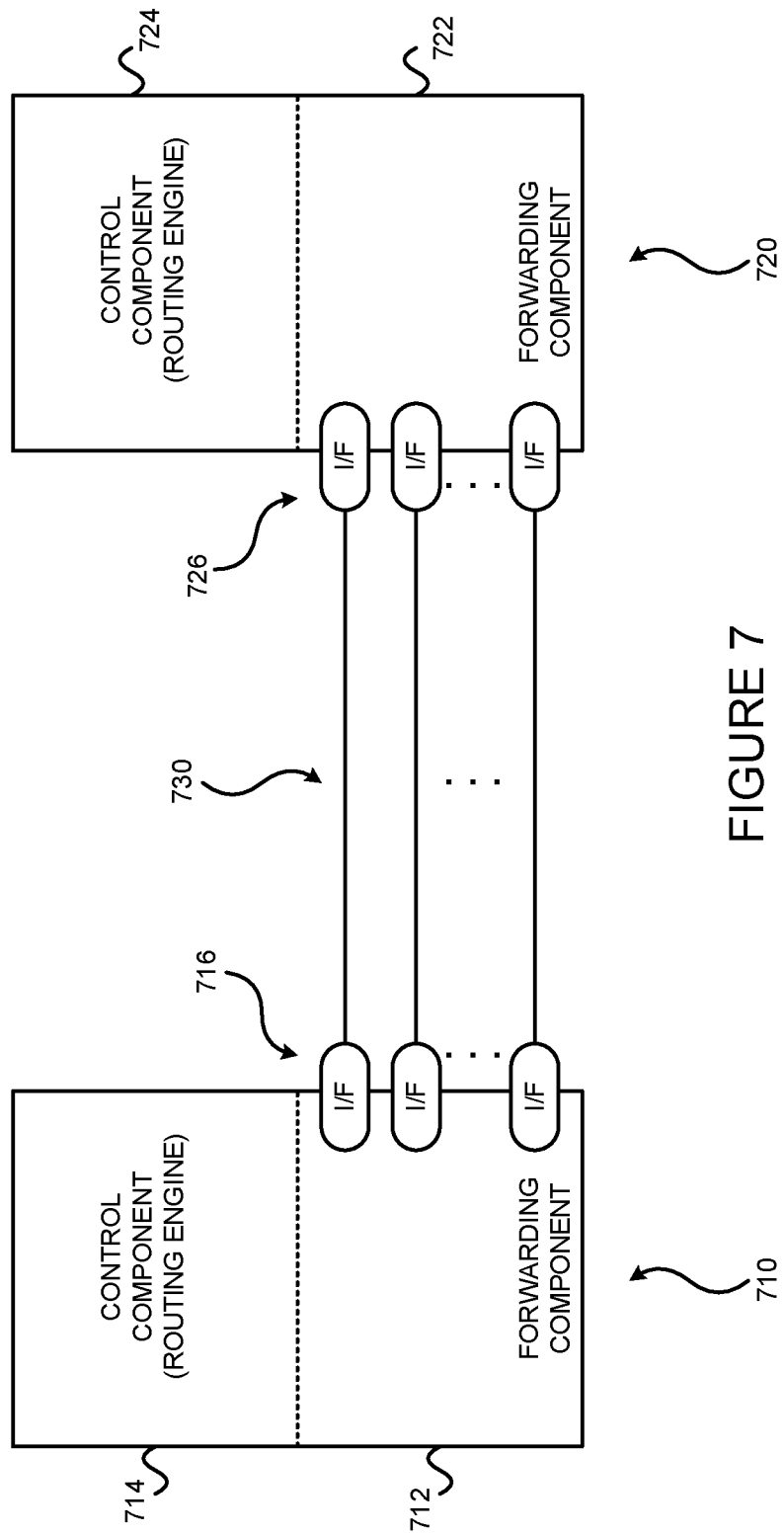
FIG. 7 illustrates an example environment including two systems coupled via communications links.

FIG. 7 illustrates two data forwarding systems 710 and 720 coupled via communications links 730. The links may be physical links or "wireless" links. The data forwarding systems 710,720 may be nodes, such as routers for example (either of which may be a source, FHR, an RP or some other data forwarding system), in PIM-SM domain. If the data forwarding systems 710,720 are example routers, each may include a control component (e.g., a routing engine) 714,724 and a forwarding component 712,722. Each data forwarding system 710,720 includes one or more interfaces 716,726 that terminate one or more communications links 730. The example method 200 described above may be implemented in the control component 714 or 724 of device 710 or 720, respectively.

As just discussed above, and referring to FIG. 8, some example routers 800 include a control component (e.g., routing engine) 810 and a packet forwarding component (e.g., a packet forwarding engine) 890.

The control component 810 may include an operating system (OS) kernel 820, routing protocol process(es) 830, label-based forwarding protocol process(es) 840, interface process(es) 850, user interface (e.g., command line interface) process(es) 860, and chassis process(es) 870, and may store routing table(s) 839, label forwarding information 845, and forwarding (e.g., route-based and/or label-based) table(s) 880. As shown, the routing protocol process(es) 830 may support routing protocols such as the routing information protocol ("RIP") 831, the intermediate system-to-intermediate system protocol ("IS-IS") 832, the open shortest path first protocol ("OSPF") 833, the enhanced interior gateway routing protocol ("EIGRP") 834 and the border gateway protocol ("BGP") 835, and the label-based forwarding protocol process(es) 840 may support protocols such as BGP 835, the label distribution protocol ("LDP") 836 and the resource reservation protocol ("RSVP") 837. Although not shown, the routing protocols process(es) 830 may support PIM-SM. One or more components (not shown) may permit a user 865 to interact with the user interface process(es) 860. Similarly, one or more components (not shown) may permit an outside device to interact with one or more of the router protocol process(es) 830, the label-based forwarding protocol process(es) 840, the interface process(es) 850, and the chassis process(es) 870, via SNMP 885, and such processes may send information to an outside device via SNMP 885.

The packet forwarding component 890 may include a microkernel 892, interface process(es) 893, distributed ASICs 894, chassis process(es) 895 and forwarding (e.g., route-based and/or label-based) table(s) 896.

Figure 8:
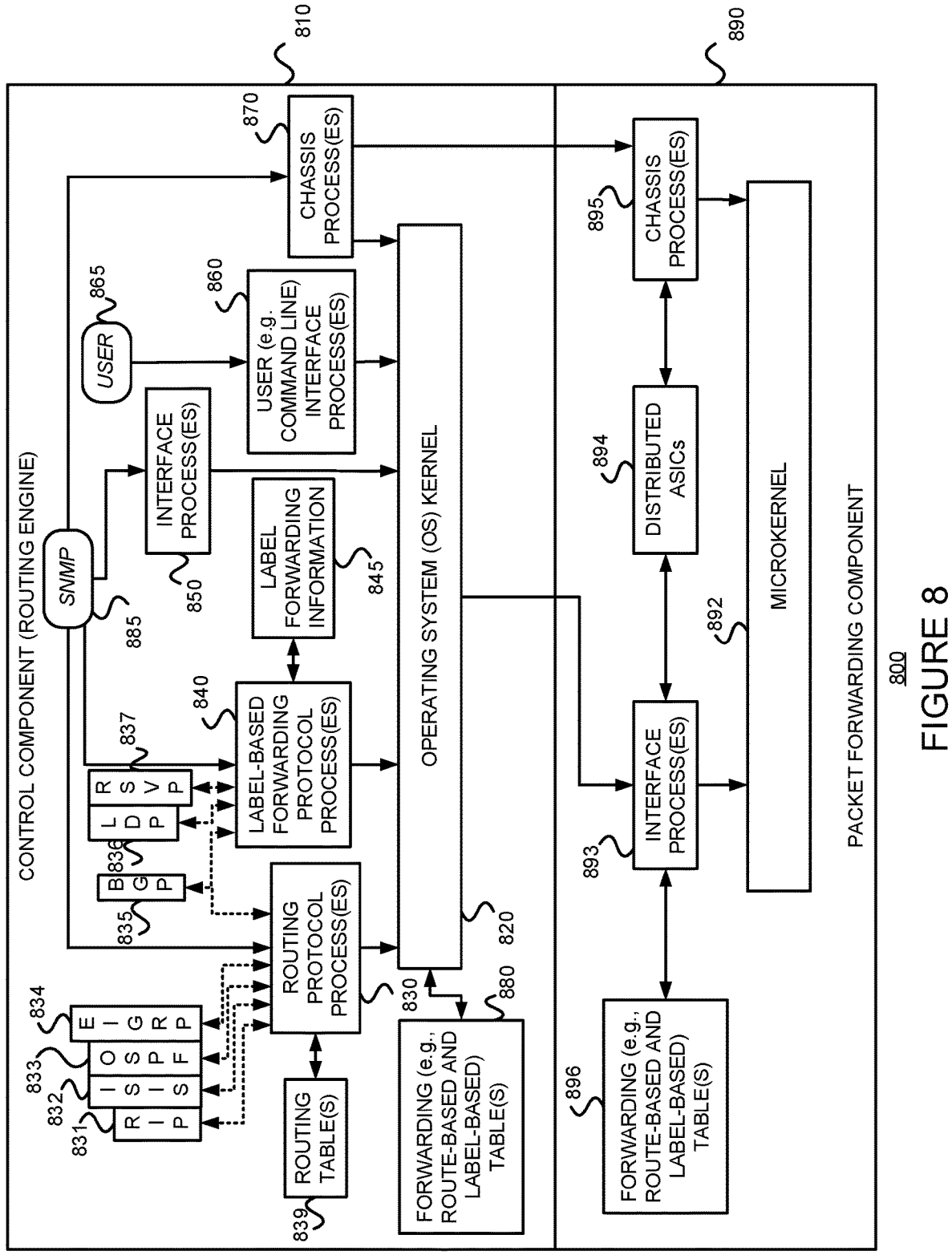
FIG. 8 is a block diagram of an example router on which the example methods of the present description may be implemented.

In the example router 800 of FIG. 8, the control component 810 handles tasks such as performing routing protocols, performing label-based forwarding protocols, control packet processing, etc., which frees the packet forwarding component 890 to forward received packets quickly. That is, received control packets (e.g., routing protocol packets and/or label-based forwarding protocol packets) are not fully processed on the packet forwarding component 890 itself, but are passed to the control component 810, thereby reducing the amount of work that the packet forwarding component 890 has to do and freeing it to process packets to be forwarded efficiently. Thus, the control component 810 is primarily responsible for running routing protocols and/or label-based forwarding protocols, maintaining the routing tables and/or label forwarding information, sending forwarding table updates to the packet forwarding component 890, and performing system management. The example control component 810 may handle routing protocol packets, provide a management interface, provide configuration management, perform accounting, and provide alarms. The processes 830, 840, 850, 860 and 870 may be modular, and may interact with the OS kernel 820. That is, nearly all of the processes communicate directly with the OS kernel 820. Using modular software that cleanly separates processes from each other isolates problems of a given process so that such problems do not impact other processes that may be running. Additionally, using modular software facilitates easier scaling.

Still referring to FIG. 8, the example OS kernel 820 may incorporate an application programming interface ("API")

system for external program calls and scripting capabilities. The control component 810 may be based on an Intel PCI platform running the OS from flash memory, with an alternate copy stored on the router's hard disk. The OS kernel 820 is layered on the Intel PCI platform and establishes communication between the Intel PCI platform and processes of the control component 810. The OS kernel 820 also ensures that the forwarding tables 896 in use by the packet forwarding component 890 are in sync with those 880 in the control component 810. Thus, in addition to providing the underlying infrastructure to control component 810 software processes, the OS kernel 820 also provides a link between the control component 810 and the packet forwarding component 890.

Referring to the routing protocol process(es) 830 of FIG. 8, this process(es) 830 provides routing and routing control functions within the platform. In this example, the RIP 831, ISIS 832, OSPF 833 and EIGRP 834 (and BGP 835) protocols are provided. Naturally, other routing protocols (e.g., PIM-SM) may be provided in addition, or alternatively. Similarly, the label-based forwarding protocol process(es) 840 provides label forwarding and label control functions. In this example, the LDP 836 and RSVP 837 (and BGP 835) protocols are provided. Naturally, other label-based forwarding protocols (e.g., MPLS) may be provided in addition, or alternatively. In the example router 800, the routing table(s) 839 is produced by the routing protocol process(es) 830, while the label forwarding information 845 is produced by the label-based forwarding protocol process (es) 840.

Still referring to FIG. 8, the interface process(es) 850 performs configuration of the physical interfaces (Recall, e.g., 716 and 726 of FIG. 7.) and encapsulation.

The example control component 810 may provide several ways to manage the router. For example, it 810 may provide a user interface process(es) 860 which allows a system operator 865 to interact with the system through configuration, modifications, and monitoring. The SNMP 885 allows SNMP-capable systems to communicate with the router platform. This also allows the platform to provide necessary SNMP information to external agents. For example, the SNMP 885 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 810, thereby avoiding slowing traffic forwarding by the packet forwarding component 890.

Although not shown, the example router 800 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 860 via a console port, an auxiliary port, and/or a management Ethernet port The packet forwarding component 890 is responsible for properly outputting received packets as quickly as possible. If there is no entry in the forwarding table for a given destination or a given label and the packet forwarding component 890 cannot perform forwarding by itself, it 890 may send the packets bound for that unknown destination off to the control component 810 for processing. The example packet forwarding component 890 is designed to perform Layer 2 and Layer 3 switching, route lookups, and rapid packet forwarding.

As shown in FIG. 8, the example packet forwarding component 890 has an embedded microkernel 892, interface process(es) 893, distributed ASICs 894, and chassis process (es) 895, and stores a forwarding (e.g., route-based and/or label-based) table(s) 896. The microkernel 892 interacts with the interface process(es) 893 and the chassis process (es) 895 to monitor and control these functions. The interface process(es) 892 has direct communication with the OS kernel 820 of the control component 810. This communication includes forwarding exception packets and control packets to the control component 810, receiving packets to be forwarded, receiving forwarding table updates, providing information about the health of the packet forwarding component 890 to the control component 810, and permitting configuration of the interfaces from the user interface (e.g., CLI) process(es) 860 of the control component 810. The stored forwarding table(s) 896 is static until a new one is received from the control component 810. The interface process(es) 893 uses the forwarding table(s) 896 to look up next-hop information. The interface process(es) 893 also has direct communication with the distributed ASICs 894. Finally, the chassis process(es) 895 may communicate directly with the microkernel 892 and with the distributed ASICs 894.

In the example router 800, the example method 200 consistent with the present disclosure may be implemented in the control component 810.

Figure 9:
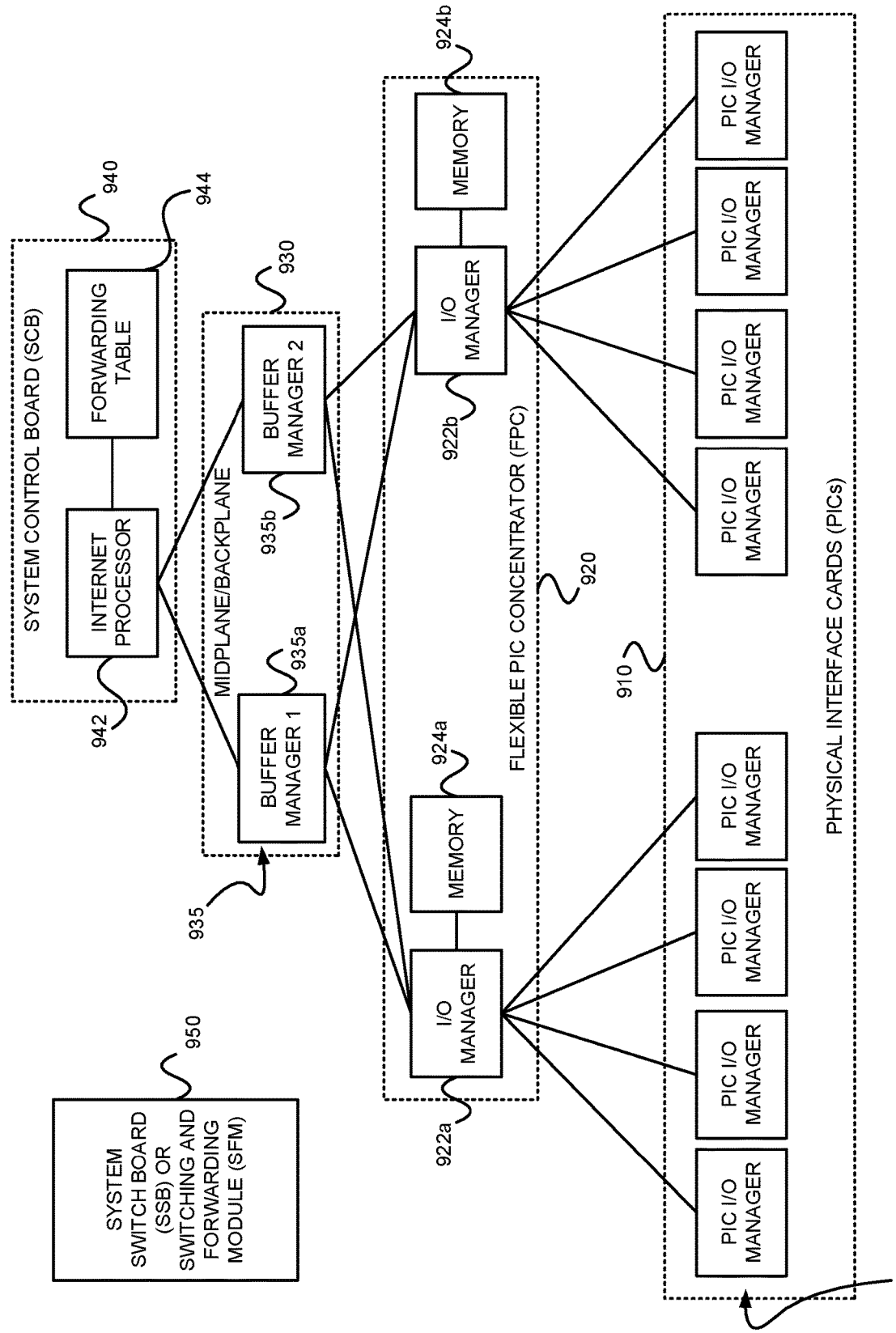
FIG. 9 is a block diagram of example distributed application specific integrated circuits ("ASICs") that may be provided in the example router of FIG. 8.

Referring back to distributed ASICs 894 of FIG. 8, FIG. 9 is an example of how the ASICS may be distributed in the packet forwarding component 890 to divide the responsibility of packet forwarding. As shown in FIG. 9, the ASICs of the packet forwarding component 890 may be distributed on physical interface cards ("PICs") 910, flexible PIC concentrators ("FPCs") 920, a midplane or backplane 930, and a system control board(s) 940 (for switching and/or forwarding). Switching fabric is also shown as a system switch board ("SSB"), or a switching and forwarding module ("SFM") 950. Each of the PICs 910 includes one or more PIC I/O managers 915. Each of the FPCs 920 includes one or more I/O managers 922, each with an associated memory 924. The midplane/backplane 930 includes buffer managers 935*a*, 935*b*. Finally, the system control board 940 includes an internet processor 942 and an instance of the forwarding table 944 (Recall, e.g., 896 of FIG. 8).

Still referring to FIG. 9, the PICs 910 contain the interface ports. Each PIC 910 may be plugged into an FPC 920. Each individual PIC 910 may contain an ASIC that handles media-specific functions, such as framing or encapsulation. Some example PICs 910 provide SDH/SONET, ATM, Gigabit Ethernet, Fast Ethernet, and/or DS3/E3 interface ports.

An FPC 920 can contain from one or more PICs 910, and may carry the signals from the PICs 910 to the midplane/backplane 930 as shown in FIG. 9.

The midplane/backplane 930 holds the line cards. The line cards may connect into the midplane/backplane 930 when inserted into the example router's chassis from the front. The control component (e.g., routing engine) 810 may plug into the rear of the midplane/backplane 930 from the rear of the chassis. The midplane/backplane 930 may carry electrical (or optical) signals and power to each line card and to the control component 810.

The system control board 940 may perform forwarding lookup. It 940 may also communicate errors to the routing engine. Further, it 940 may also monitor the condition of the router based on information it receives from sensors. If an abnormal condition is detected, the system control board 940 may immediately notify the control component 810.

Referring to FIGS. 9, 10A and 10B, in some exemplary routers, each of the PICs 910,810' contains at least one I/O manager ASIC 915 responsible for media-specific tasks, such as encapsulation. The packets pass through these I/O ASICs on their way into and out of the router. The I/O manager ASIC 915 on the PIC 910,810' is responsible for managing the connection to the I/O manager ASIC 922 on the FPC 920,820', managing link-layer framing and creating the bit stream, performing cyclical redundancy checks ("CRCs"), and detecting link-layer errors and generating alarms, when appropriate. The FPC 920 includes another I/O manager ASIC 922. This ASIC 922 takes the packets from the PICs 910 and breaks them into (e.g., 64-byte) memory blocks. This FPC I/O manager ASIC 922 sends the blocks to a first distributed buffer manager (DBM) 935a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 935a' manages and writes packets to the shared memory 924 across all FPCs 920. In parallel, the first DBM ASIC 935a' also extracts information on the destination of the packet and passes this forwarding-related information to the Internet processor 942/842'. The Internet processor 942/842' performs the route lookup using the forwarding table 944 and sends the information over to a second DBM ASIC 935b'. The Internet processor ASIC 942/842' also collects exception packets (i.e., those without a forwarding table entry) and sends them to the control component 810. The second DBM ASIC 935b' then takes this information and the 64-byte blocks and forwards them to the I/O manager ASIC 922 of the egress FPC 920/820' (or multiple egress FPCs, in the case of multicast) for reassembly. (Thus, the DBM ASICs 935a' and 935b' are responsible for managing the packet memory 924 distributed across all FPCs 920/820', extracting forwarding-related information from packets, and instructing the FPC where to forward packets.)

The I/O manager ASIC 922 on the egress FPC 920/820' may perform some value-added services. In addition to incrementing time to live ("TTL") values and re-encapsulating the packet for handling by the PIC 910, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 922 on the egress FPC 920/820' may be responsible for receiving the blocks from the second DBM ASIC 935b', incrementing TTL values, queuing a pointer to the packet, if necessary, before applying CoS rules, re-encapsulating the blocks, and sending the encapsulated packets to the PIC I/O manager ASIC 915.

Figure 11:
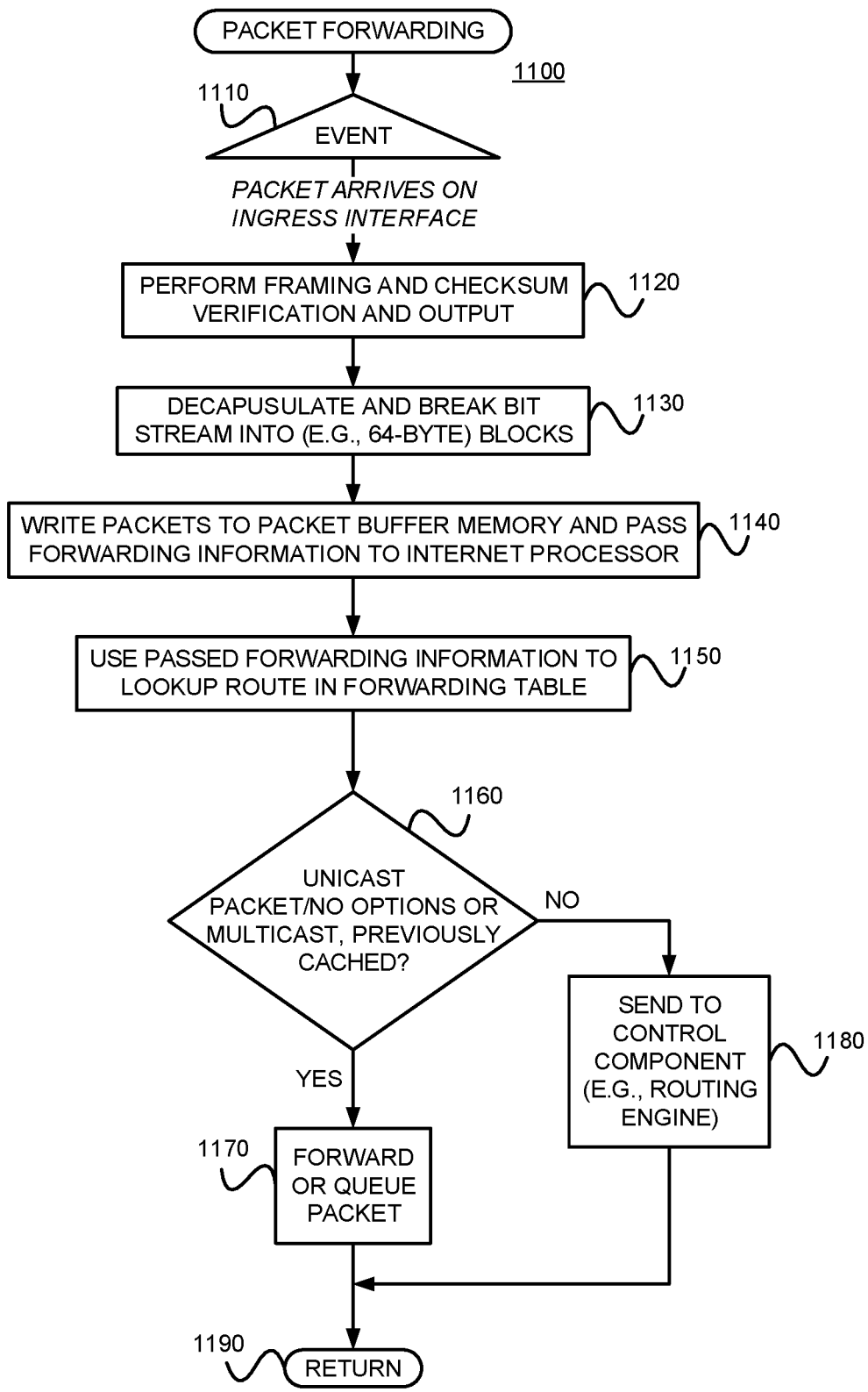
FIG. 11 is a flow diagram of an example packet forwarding method that may be implemented on any of the example routers of FIGS. 8 and 9.

FIG. 11 is a flow diagram of an example method 1100 for providing packet forwarding in the example router. The main acts of the method 1100 are triggered when a packet is received on an ingress (incoming) port or interface. (Event 1110) The types of checksum and frame checks that are required by the type of medium it serves are performed and the packet is output, as a serial bit stream. (Block 1120) The packet is then decapsulated and parsed into (e.g., 64-byte) blocks. (Block 1130) The packets are written to buffer memory and the forwarding information is passed on the Internet processor. (Block 1140) The passed forwarding information is then used to lookup a route in the forwarding table. (Block 1150) (Recall, e.g., FIGS. 7A-7D.) Note that the forwarding table can typically handle unicast packets that do not have options (e.g., accounting) set, and multicast packets for which it already has a cached entry. Thus, if it is determined that these conditions are met (YES branch of Decision 1160), the packet forwarding component finds the next hop and egress interface, and the packet is forwarded (or queued for forwarding) to the next hop via the egress interface (Block 1170) before the method 1100 is left (Node 1190) Otherwise, if these conditions are not met (NO branch of Decision 1160), the forwarding information is sent to the control component 810 for advanced forwarding resolution (Block 1180) before the method 1100 is left (Node 1190).

Referring back to block 1170, the packet may be queued. Actually, as stated earlier with reference to FIG. 9, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 922 may send a request for the packet to the second DBM ASIC 935b. The DBM ASIC 935 reads the blocks from shared memory and sends them to the I/O manager ASIC 922 on the FPC 920, which then serializes the bits and sends them to the media-specific ASIC of the egress interface. The I/O manager ASIC 915 on the egress PIC 910 may apply the physical-layer framing, perform the CRC, and send the bit stream out over the link.

Referring back to block 1180 of FIG. 11, as well as FIG. 9, regarding the transfer of control and exception packets, the system control board 940 handles nearly all exception packets. For example, the system control board 940 may pass exception packets to the control component 810.

Although example embodiments consistent with the present disclosure may be implemented on the example routers of FIG. 7 or 8, embodiments consistent with the present disclosure may be implemented on communications network nodes (e.g., routers, switches, etc.) having different architectures. More generally, embodiments consistent with the present disclosure may be implemented on an example system 1200 as illustrated on FIG. 12.

Figure 12:
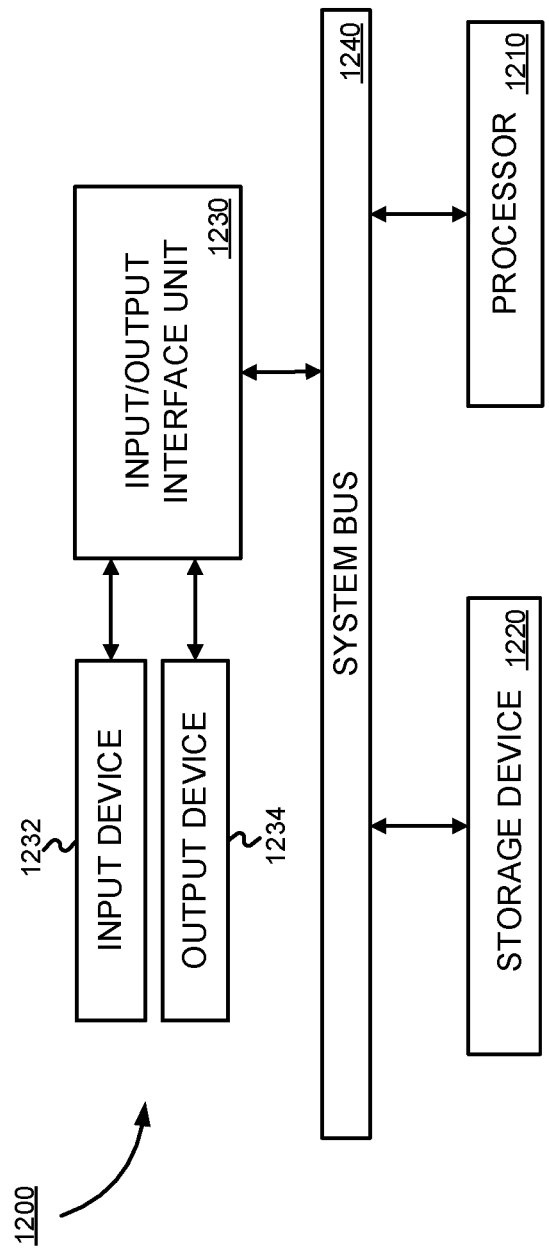
FIG. 12 is a block diagram of an example processor-based system that may be used to execute the example methods for processing an egress packet and/or to store information used and/or generated by such example methods.

FIG. 12 is a block diagram of an exemplary machine 1200 that may perform one or more of the methods described, and/or store information used and/or generated by such methods. The exemplary machine 1200 includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1220 and/or may be received from an external source via one or more input interface units 1230. The machine executable instructions may be stored as various software modules, each module performing one or more operations. Functional software modules are examples of components which may be used in the apparatus described.

In some embodiments consistent with the present disclosure, the processors 1210 may be one or more microprocessors and/or ASICs. The bus 1240 may include a system bus.

The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.6 Conclusions

As should be apparent from the foregoing description, example RPs consistent with the present description can provide a number of advantages. First, the RP will have consistent register state machines, even in the presence of multiple FHRs for a given S,G. Second, the RP will have efficient CPU utilization while maintaining the register state machine with multiple FHRs. For example, the RP is no longer busy in overwriting the register state machines repeatedly (e.g., continuously). Third, the MSDP protocol will use bandwidth more efficiently by avoiding the overhead of sending frequent MSDP SA refresh messages in the presence of multiple FHRs. Fourth, duplicate traffic generated from the RP, which is caused due to receiving data register packets from multiple FHRs before the SPT switch is done, is eliminated. Fifth, traffic loss on failure of the selected FHR is avoided by introducing alternate register states with all the available FHRs.

Example methods and RPs consistent with the present description provide a robust and simple solution; only the RP need be changed. For example, no changes are needed on the FHR(s).

What is claimed is:

1. A rendezvous point router for a protocol independent multicast (PIM) multicast group (G), the rendezvous point router comprising:

a) a non-transitory storage device;
b) a plurality of interfaces for receiving or transmitting data; and
c) at least one hardware processor configured to
  1) receive a non-null register message from a first, first hop router (first FHR) between a source (S) of the multicast group (G) and the rendezvous point router, and then determine, responsive to receiving the non-null register message from the first FHR between the source (S) of the multicast group (G) and the rendezvous point router, whether or not there is already register state information for the source,multicast group (S,G) pair,
  2) determine that there is not already register state information for the source,multicast group (S,G) pair, and then
    A) generate and store, in the storage device, register state information for the source,multicast group (S,G) pair, the register state information including
      (i) an Internet Protocol (IP) address of the multicast group (G),
      (ii) an IP address of the source (S),
      (iii) an IP address of the first FHR, wherein the first FHR is identified as a selected first hop router,
      (iv) at least one timer associated with the first FHR,
    B) de-encapsulate multicast data within the non-null register message and forward the de-encapsulated multicast data on any interfaces included in a downstream interface list associated with the (S,G) pair or associated with a (*,G) pair,
    C) create a reverse path forwarding (RPF) route to the first FHR and identify a corresponding interface as a native PIM interface,
    D) install a unicast de-encapsulation route and identify a corresponding PIM de-encapsulation interface so that a forwarding plane of rendezvous point router can (i) de-encapsulate any incoming non-null register messages and (ii) forward native multicast data contained within the incoming non-null register messages, and
    E) send an (S,G) join message towards the first FHR via the native PIM interface,
  3) receive a non-null register message from a second, first hop router (second FHR) between the source (S) of the multicast group (G) and the rendezvous point router, and then determine, responsive to receiving the non-null register message from the second FHR between the source (S) of the multicast group (G) and the rendezvous point router, whether or not there is already register state information including a "selected" first hop router, for the source,multicast group (S,G) pair,
  4) determine that there is already register state information including the "selected" first hop router, for the source,multicast (S,G) pair, and then
    A) update the stored register state information for the source,multicast group (S,G) pair, by adding,
      (i) an IP address of the second FHR, wherein the second FHR is not identified as a selected first hop router, and
      (ii) at least one timer associated with the second FHR,
    without overwriting any previously stored register state information for the source,multicast group (S,G) pair, B) send an (S,G) register stop message towards the second FHR, and
C) drop the multicast payload data contained in the non-null register message,
5) receive, on the native PIM interface, native multicast traffic from the source, and then responsive to receiving, on the native PIM interface, the native multicast traffic from the source,
A) forward the multicast packet to any receivers, that were previously registered with the multicast group, via previously established shared trees,
B) update the multicast route with a reverse path forwarding interface as the upstream interface for the source,multicast group (S,G) pair, and
C) send an (S,G) register stop message towards the first FHR, and
6) receive periodic (S,G) null register messages from any first hop router, and then send, responsive to receiving each of the periodic (S,G) null register messages from any first hop router, an (S,G) register stop message towards the first hop router that sourced the (S,G) null register message.

2. The rendezvous point router of claim 1 wherein the at least one processor is further configured to
7) detect a failure of the first FHR identified as the selected first hop router for the (S,G) pair, and
8) responsive to detecting the failure of the selected first hop router for the (S,G) pair,
A) delete the selected first hop router from the register state information for the (S,G) pair,
B) determine the second FHR to be a next available first hop router for the (S,G) pair,
C) identify the determined second FHR for the (S,G) pair as the "selected" first hop router for the (S,G) pair, and
D) send to any multicast source discover protocol (MSDP) peer, an MSDP refresh message.

3. The rendezvous point router of claim 2 wherein a failure of the selected first hop router for the (S,G) pair is detected when at least one of (A) a link failure towards the first FHR identified as the selected first hop router for the (S,G) pair is detected, or (B) a timeout of all (S,G) register state machines for the first FHR identified as the selected first hop router for the (S,G) pair is detected.

4. The rendezvous point router of claim 3 wherein a timeout of all (S,G) register state machines for the selected first hop router for the (S,G) pair occurs when no null register messages are received by the rendezvous point router for a period defined by the timer associated with the selected first hop router.

5. The rendezvous point router of claim 1 wherein the at least one processor is further configured to
7) detect a failure of the first FHR identified as the selected first hop router for the (S,G) pair, and
8) responsive to detecting the failure of the selected first hop router for the (S,G) pair,
A) determine that there is register state information for another first hop router for the (S,G) pair,
B) responsive to determining that there is register state information for another first hop router for the (S,G) pair,
i) determine the second FHR as a next available first hop router for the (S,G) pair,
ii) identify the determined second FHR next available first hop router for the (S,G) pair as the "selected" first hop router for the (S,G) pair, and
iii) send to a multicast source discover protocol (MSDP) peer, an MSDP refresh message, and
otherwise, responsive to determining that there is no other first hop router for the (S,G) pair, perform a cleanup of the register state information for the (S,G) group.

6. The rendezvous point router of claim 5 wherein a failure of the selected first hop router for the (S,G) pair is detected when either (A) a link failure towards the first FHR identified as the selected first hop router for the (S,G) pair is detected, or (B) a timeout of all (S,G) register state machines for the first FHR identified as the selected first hop router for the (S,G) pair is detected.

7. The rendezvous point router of claim 6 wherein a timeout of all (S,G) register state machines for the selected first hop router for the (S,G) pair occurs when no null register messages are received by the rendezvous point router for a period defined by the timer associated with the selected first hop router.

8. The rendezvous point router of claim 1 wherein the first hop router is identified as a selected first FHR in the register state information for the source,multicast group (S,G) pair stored by marking the first FHR as the selected first hop router.

9. The rendezvous point router of claim 1 wherein the acts of
A) generating and storing, in the storage device, register state information for the source,multicast group (S,G) pair, the register state information including
(i) an Internet Protocol (IP) address of the multicast group (G),
(ii) an IP address of the source (S),
(iii) an IP address of the first FHR, wherein the first FHR is identified as a selected first hop router,
(iv) at least one timer associated with the first FHR,
B) de-encapsulating multicast data within the non-null register message and forward the de-encapsulated multicast data on any interfaces included in a downstream interface list associated with the (S,G) pair or associated with a (*,G) pair,
C) creating a reverse path forwarding (RPF) route to the first FHR and identify a corresponding interface as a native PIM interface,
D) installing a unicast de-encapsulation route and identify a corresponding PIM de-encapsulation interface so that a forwarding plane of rendezvous point router can (i) de-encapsulate any incoming non-null register messages and (ii) forward native multicast data contained within the incoming non-null register messages, and
E) sending an (S,G) join message towards the first FHR via the native PIM interface,
are performed responsive to the determination that there is not already register state information for the source,multicast group (S,G) pair, and
wherein the acts of
A) updating the stored register state information for the source,multicast group (S,G) pair, by adding,
(i) an IP address of the second FHR, wherein the second FHR is not identified as a selected first hop router, and
(ii) at least one timer associated with the second FHR,
without overwriting any previously stored register state information for the source,multicast group (S,G) pair,
B) sending an (S,G) register stop message towards the second FHR, and C) dropping the multicast payload data contained in the non-null register message, are performed responsive to the determination that there is already register state information including the "selected" first hop router, for the source,multicast (S,G) pair.

10. A computer-implemented method for use by a rendezvous point router for a protocol independent multicast (PIM) multicast group (G), the computer-implemented method comprising:
  a) receiving a non-null register message from a first, first hop router (first FHR) between a source (S) of the multicast group (G) and the rendezvous point router, and then responsive to receiving the non-null register message from the first FHR between the source (S) of the multicast group (G) and the rendezvous point router, determining whether or not there is already register state information for the source,multicast group (S,G) pair;
  b) determine that there is not already register state information for the source,multicast group (S,G) pair, and then
    1) generating and storing, in a storage device, register state information for the source,multicast group (S,G) pair, the register state information including
      (i) an Internet Protocol (IP) address of the multicast group (G),
      (ii) an IP address of the source (S),
      (iii) an IP address of the first FHR, wherein the first FHR is identified as a selected first hop router,
      (iv) at least one timer associated with the first FHR;
    2) de-encapsulating multicast data within the non-null register message and forwarding the de-encapsulated multicast data on any interfaces included in a downstream interface list associated with the (S,G) pair or associated with a (*,G) pair,
    3) creating a reverse path forwarding (RPF) route to the first FHR and identifying a corresponding interface as a native PIM interface,
    4) installing a unicast de-encapsulation route and identifying a corresponding PIM de-encapsulation interface so that a forwarding plane of rendezvous point router can (i) de-encapsulate any incoming non-null register messages and (ii) forward native multicast data contained within the incoming non-null register messages, and
    5) sending an (S,G) join message towards the first FHR via the native PIM interface;
  c) receiving a non-null register message from a second, first hop router (second FHR) between the source (S) of the multicast group (G) and the rendezvous point router, and then responsive to receiving the non-null register message from the second FHR between the source (S) of the multicast group (G) and the rendezvous point router, determining whether or not there is already register state information, including a "selected" first hop router, for the source,multicast group (S,G) pair;
  d) determine that there is already register state information, including the "selected" first hop router, for the source,multicast (S,G) pair, and then
    1) updating the stored register state information for the source,multicast group (S,G) pair, by adding,
      (i) an IP address of the second FHR, wherein the second FHR is not identified as a selected first hop router, and
      (ii) at least one timer associated with the second FHR,
    without overwriting any previously stored register state information for the source,multicast group (S,G) pair,
    2) sending an (S,G) register stop message towards the second FHR, and
    3) dropping the multicast payload data contained in the non-null register message;
  e) receiving, on the native PIM interface, native multicast traffic from the source, and then responsive to receiving, on the native PIM interface, native multicast traffic from the source,
    1) forwarding the multicast packet to any receivers, that were previously registered with the multicast group, via previously established shared trees,
    2) updating the multicast route with a reverse path forwarding interface as the upstream interface for the source,multicast group (S,G) pair, and
    3) sending an (S,G) register stop message towards the first FHR; and
  f) receiving periodic (S,G) null register messages from any first hop router, and responsive to receiving each of the periodic (S,G) null register messages from any first hop router, sending an (S,G) register stop message towards the first hop router that sourced the (S,G) null register message.

11. The computer-implemented method of claim 10 further comprising:
  g) detecting a failure of the first FHR identified as the selected first hop router for the (S,G) pair; and
  h) responsive to detecting the failure of the selected first hop router for the (S,G) pair,
    1) deleting the selected first hop router from the register state information for the (S,G) pair,
    2) determining the second FHR as a next available first hop router for the (S,G) pair,
    3) identifying the second FHR as the "selected" first hop router for the (S,G) pair, and
    4) sending to any multicast source discovery protocol (MSDP) peer, an MSDP refresh message.

12. The computer-implemented method of claim 11 wherein a failure of the selected first hop router for the (S,G) pair is detected when either (A) a link failure towards the first hop router identified as the selected first hop router for the (S,G) pair is detected, or (B) a timeout of all (S,G) register state machines for the first hop router identified as the selected first hop router for the (S,G) pair is detected.

13. The computer-implemented method of claim 12 wherein a timeout of all (S,G) register state machines for the selected first hop router for the (S,G) pair occurs when no null register messages are received for a period defined by the timer associated with the selected first hop router.

14. The computer-implemented method of claim 10 further comprising:
  g) detecting a failure of the first FHR identified as the selected first hop router for the (S,G) pair; and
  h) responsive to detecting the failure of the selected first hop router for the (S,G) pair,
    1) determining whether or not there is register state information for another first hop router for the (S,G) pair,
    2) responsive to determining that there is register state information for another first hop router for the (S,G) pair,
      1) determining the second FHR as a next available first hop router for the (S,G) pair, 2) identifying the second FHR as the "selected" first hop router for the (S,G) pair, and
3) sending to a multicast source discover protocol (MSDP) peer, an MSDP refresh message, and otherwise, responsive to determining that there is no other first hop router for the (S,G) pair, performing a cleanup of the register state information for the (S,G) group.

15. The computer-implemented method of claim 14 wherein a failure of the selected first hop router for the (S,G) pair is detected when either (A) a link failure towards the first hop router identified as the selected first hop router for the (S,G) pair is detected, or (B) a timeout of all (S,G) register state machines for the first hop router identified as the selected first hop router for the (S,G) pair is detected.

16. The computer-implemented method of claim 15 wherein a timeout of all (S,G) register state machines for the selected first hop router for the (S,G) pair occurs when no null register messages are received for a period defined by the timer associated with the selected first hop router.

17. The computer-implemented method of claim 10 wherein the first hop router is identified as a selected first hop router in the register state information for the source, multicast group (S,G) pair stored by marking the first hop router as the selected first hop router.

18. The computer-implemented method of claim 10, wherein the acts of
1) generating and storing, in a storage device, register state information for the source,multicast group (S,G) pair, the register state information including
   (i) an Internet Protocol (IP) address of the multicast group (G),
   (ii) an IP address of the source (S),
   (iii) an IP address of the first FHR, wherein the first FHR is identified as a selected first hop router,
   (iv) at least one timer associated with the first FHR;
2) de-encapsulating multicast data within the non-null register message and forwarding the de-encapsulated multicast data on any interfaces included in a downstream interface list associated with the (S,G) pair or associated with a (*,G) pair,
3) creating a reverse path forwarding (RPF) route to the first FHR and identifying a corresponding interface as a native PIM interface,
4) installing a unicast de-encapsulation route and identifying a corresponding PIM de-encapsulation interface so that a forwarding plane of rendezvous point router can (i) de-encapsulate any incoming non-null register messages and (ii) forward native multicast data contained within the incoming non-null register messages, and
5) sending an (S,G) join message towards the first FHR via the native PIM interface, are performed responsive to a determination that there is not already register state information for the source,multicast group (S,G) pair, and
wherein the acts of
1) updating the stored register state information for the source,multicast group (S,G) pair, by adding,
   (i) an IP address of the second FHR, wherein the second FHR is not identified as a selected first hop router, and
   (ii) at least one timer associated with the second FHR,
without overwriting any previously stored register state information for the source,multicast group (S,G) pair, 2) sending an (S,G) register stop message towards the second FHR, and
3) dropping the multicast payload data contained in the non-null register message, are performed responsive to the determination that there is already register state information, including the "selected" first hop router, for the source,multicast (S,G) pair.

19. A non-transitory computer-readable storage medium storing processor-executable instructions which, when executed by at least one processor, perform a computer-implemented method for use by a rendezvous point router for a protocol independent multicast (PIM) multicast group (G), the computer-implemented method comprising:
a) receiving a non-null register message from a first, first hop router (first FHR) between a source (S) of the multicast group (G) and the rendezvous point router, and then responsive to receiving the non-null register message from the first FHR between the source (S) of the multicast group (G) and the rendezvous point router, determining whether or not there is already register state information for the source,multicast group (S,G) pair;
b) determine that there is not already register state information for the source,multicast group (S,G) pair, and then
   1) generating and storing, in a storage device, register state information for the source,multicast group (S,G) pair, the register state information including
      (i) an Internet Protocol (IP) address of the multicast group (G),
      (ii) an IP address of the source (S),
      (iii) an IP address of the first FHR, wherein the first FHR is identified as a selected first hop router,
      (iv) at least one timer associated with the first FHR;
   2) de-encapsulating multicast data within the non-null register message and forwarding the de-encapsulated multicast data on any interfaces included in a downstream interface list associated with the (S,G) pair or associated with a (*,G) pair,
   3) creating a reverse path forwarding (RPF) route to the first FHR and identifying a corresponding interface as a native PIM interface,
   4) installing a unicast de-encapsulation route and identifying a corresponding PIM de-encapsulation interface so that a forwarding plane of rendezvous point router can (i) de-encapsulate any incoming non-null register messages and (ii) forward native multicast data contained within the incoming non-null register messages, and
   5) sending an (S,G) join message towards the first FHR via the native PIM interface;
c) receiving a non-null register message from a second, first hop router (second FHR) between the source (S) of the multicast group (G) and the rendezvous point router, and then responsive to receiving the non-null register message from the second FHR between the source (S) of the multicast group (G) and the rendezvous point router, determining whether or not there is already register state information, including a "selected" first hop router, for the source,multicast group (S,G) pair;
d) determine that there is already register state information, including the "selected" first hop router, for the source,multicast (S,G) pair, and then
   1) updating the stored register state information for the source,multicast group (S,G) pair, by adding, (i) an IP address of the second FHR, wherein the second FHR is not identified as a selected first hop router, and (ii) at least one timer associated with the second FHR, without overwriting any previously stored register state information for the source,multicast group (S,G) pair, 2) sending an (S,G) register stop message towards the second FHR, and 3) dropping the multicast payload data contained in the non-null register message;

e) receiving, on the native PIM interface, native multicast traffic from the source, and then responsive to receiving, on the native PIM interface, native multicast traffic from the source, 1) forwarding the multicast packet to any receivers, that were previously registered with the multicast group, via previously established shared trees, 2) updating the multicast route with a reverse path forwarding interface as the upstream interface for the source,multicast group (S,G) pair, and 3) sending an (S,G) register stop message towards the first FHR; and f) receiving periodic (S,G) null register messages from any first hop router, and responsive to receiving each of the periodic (S,G) null register messages from any first hop router, sending an (S,G) register stop message towards the first hop router that sourced the (S,G) null register message.

20. The non-transitory computer-readable storage medium of claim 19, wherein the acts of 1) generating and storing, in a storage device, register state information for the source,multicast group (S,G) pair, the register state information including (i) an Internet Protocol (IP) address of the multicast group (G), (ii) an IP address of the source (S), (iii) an IP address of the first FHR, wherein the first FHR is identified as a selected first hop router, (iv) at least one timer associated with the first FHR;

2) de-encapsulating multicast data within the non-null register message and forwarding the de-encapsulated multicast data on any interfaces included in a downstream interface list associated with the (S,G) pair or associated with a (*,G) pair, 3) creating a reverse path forwarding (RPF) route to the first FHR and identifying a corresponding interface as a native PIM interface, 4) installing a unicast de-encapsulation route and identifying a corresponding PIM de-encapsulation interface so that a forwarding plane of rendezvous point router can (i) de-encapsulate any incoming non-null register messages and (ii) forward native multicast data contained within the incoming non-null register messages, and 5) sending an (S,G) join message towards the first FHR via the native PIM interface, are performed responsive to a determination that there is not already register state information for the source,multicast group (S,G) pair, and wherein the acts of 1) updating the stored register state information for the source,multicast group (S,G) pair, by adding, (i) an IP address of the second FHR, wherein the second FHR is not identified as a selected first hop router, and (ii) at least one timer associated with the second FHR, without overwriting any previously stored register state information for the source,multicast group (S,G) pair, 2) sending an (S,G) register stop message towards the second FHR, and 3) dropping the multicast payload data contained in the non-null register message, are performed responsive to the determination that there is already register state information, including the "selected" first hop router, for the source,multicast (S,G) pair.

* * * * *